United States Patent Office 2,761,328
Patented Sept. 4, 1956

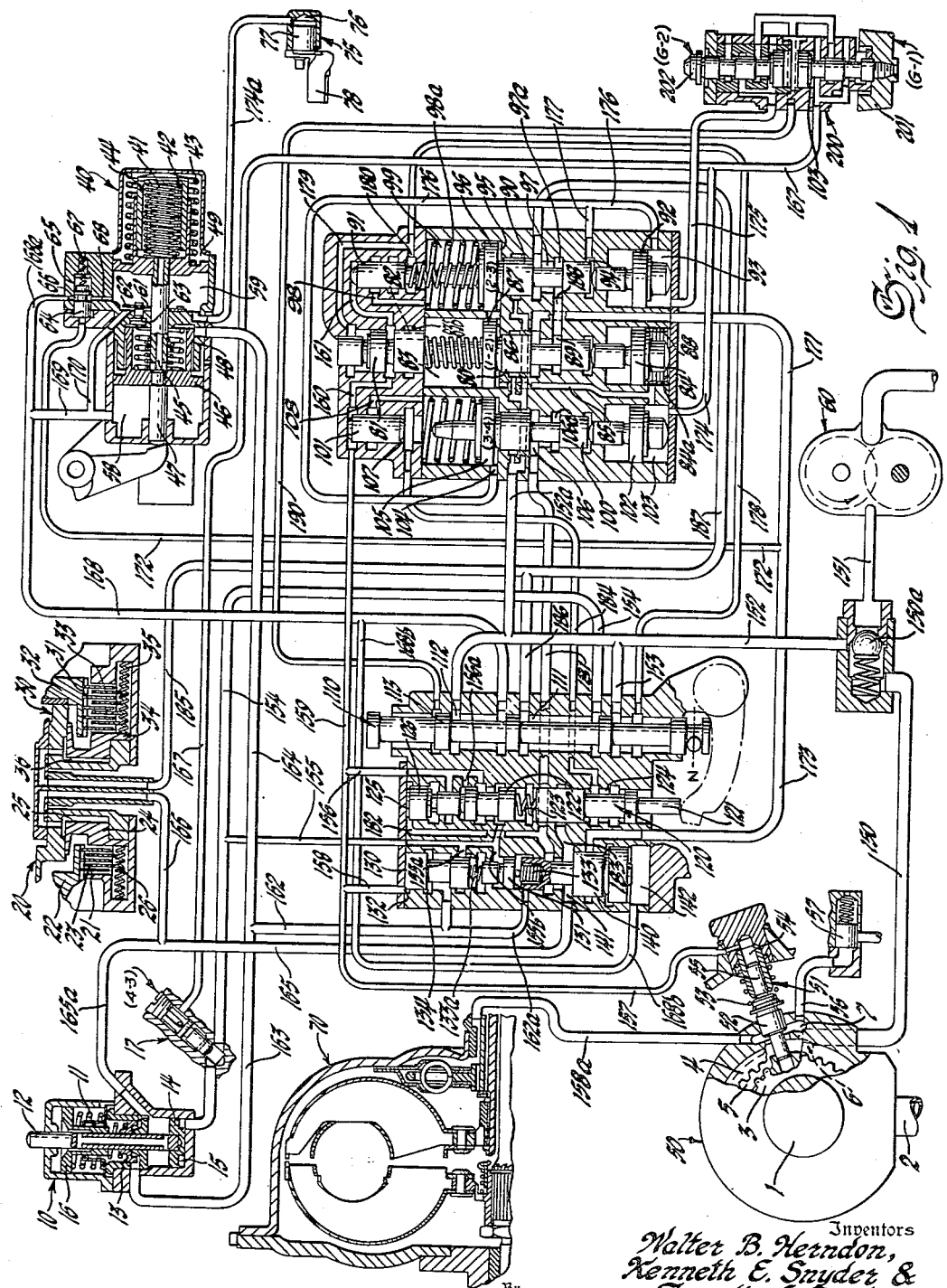

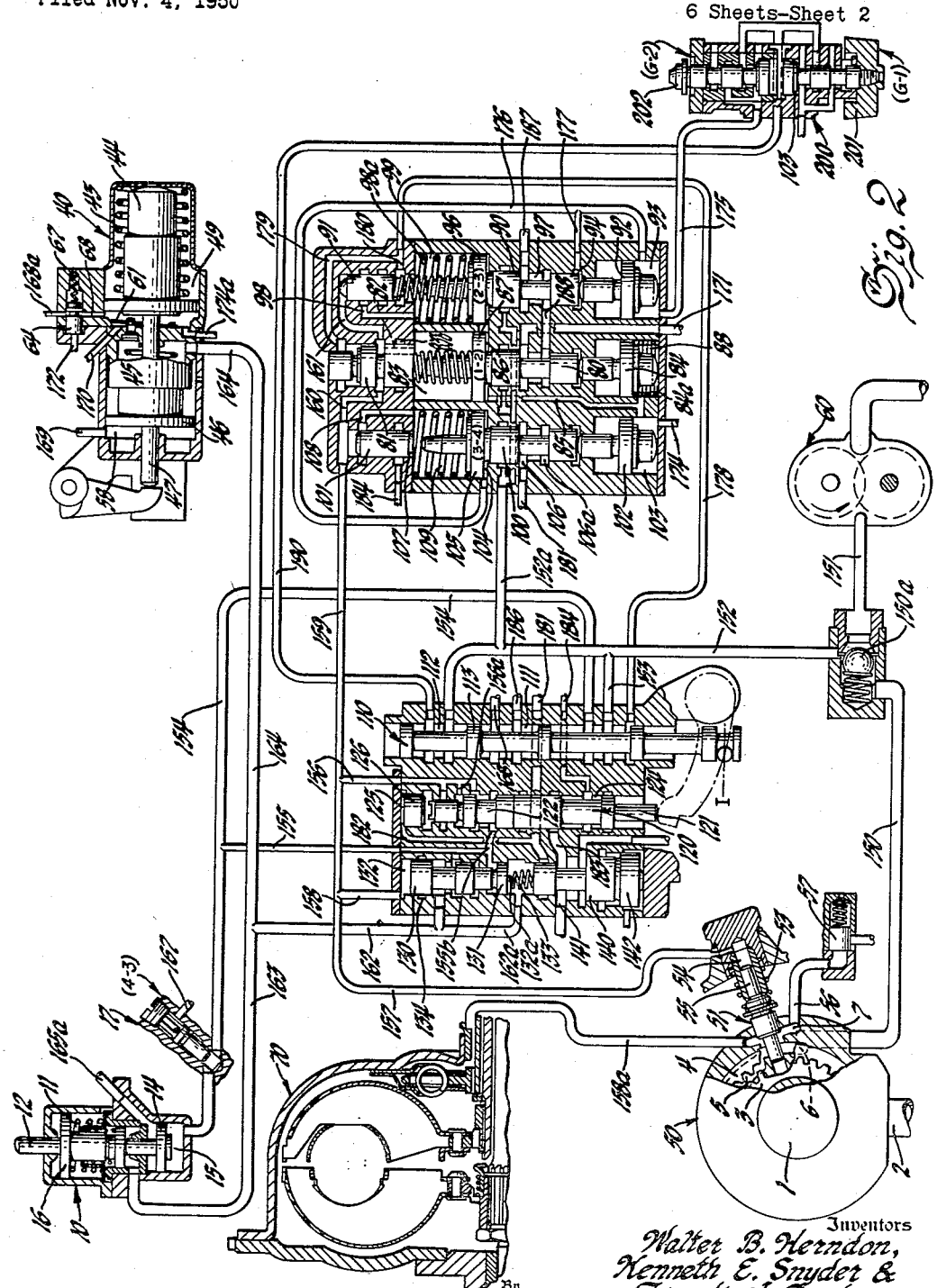

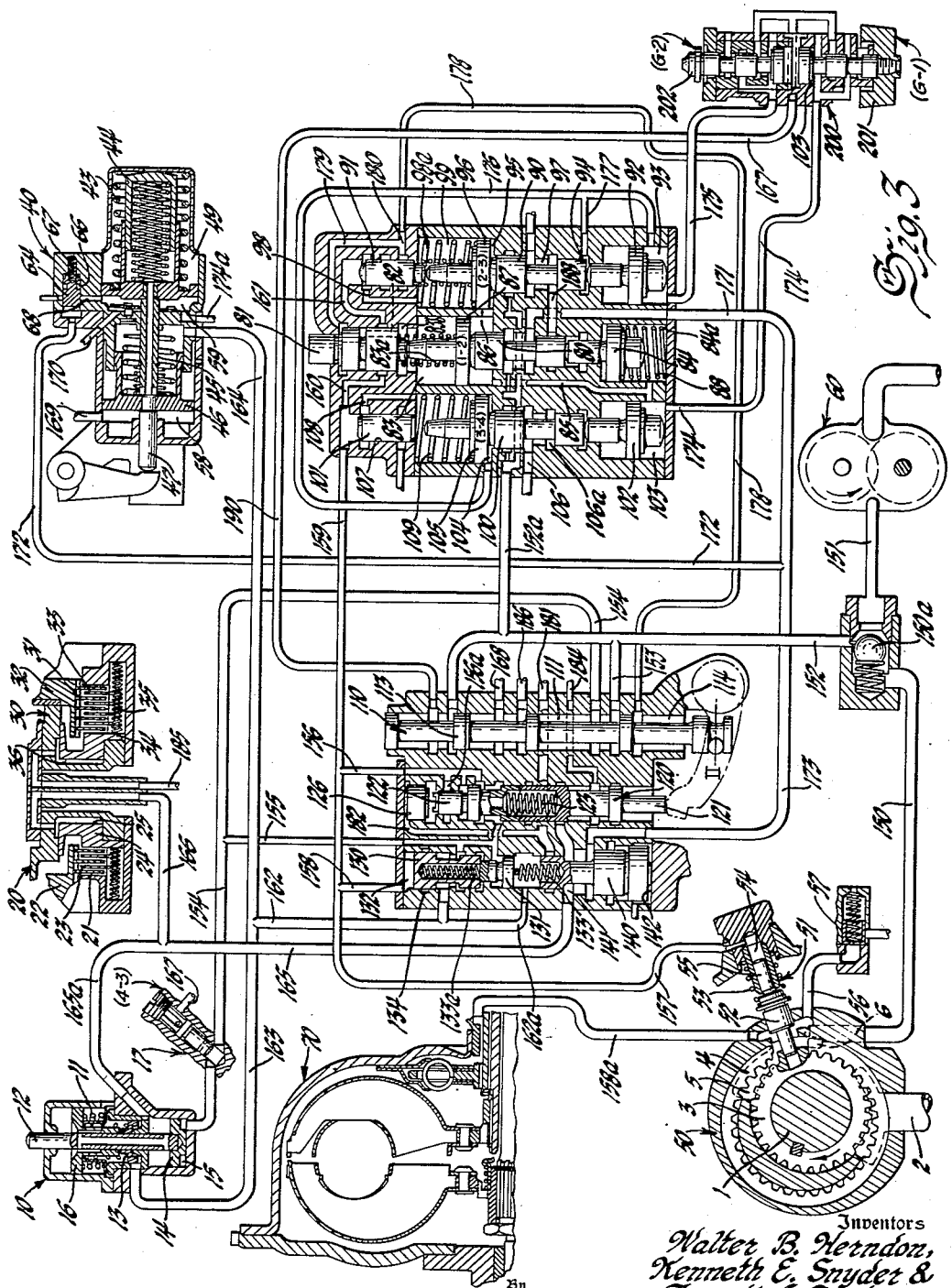

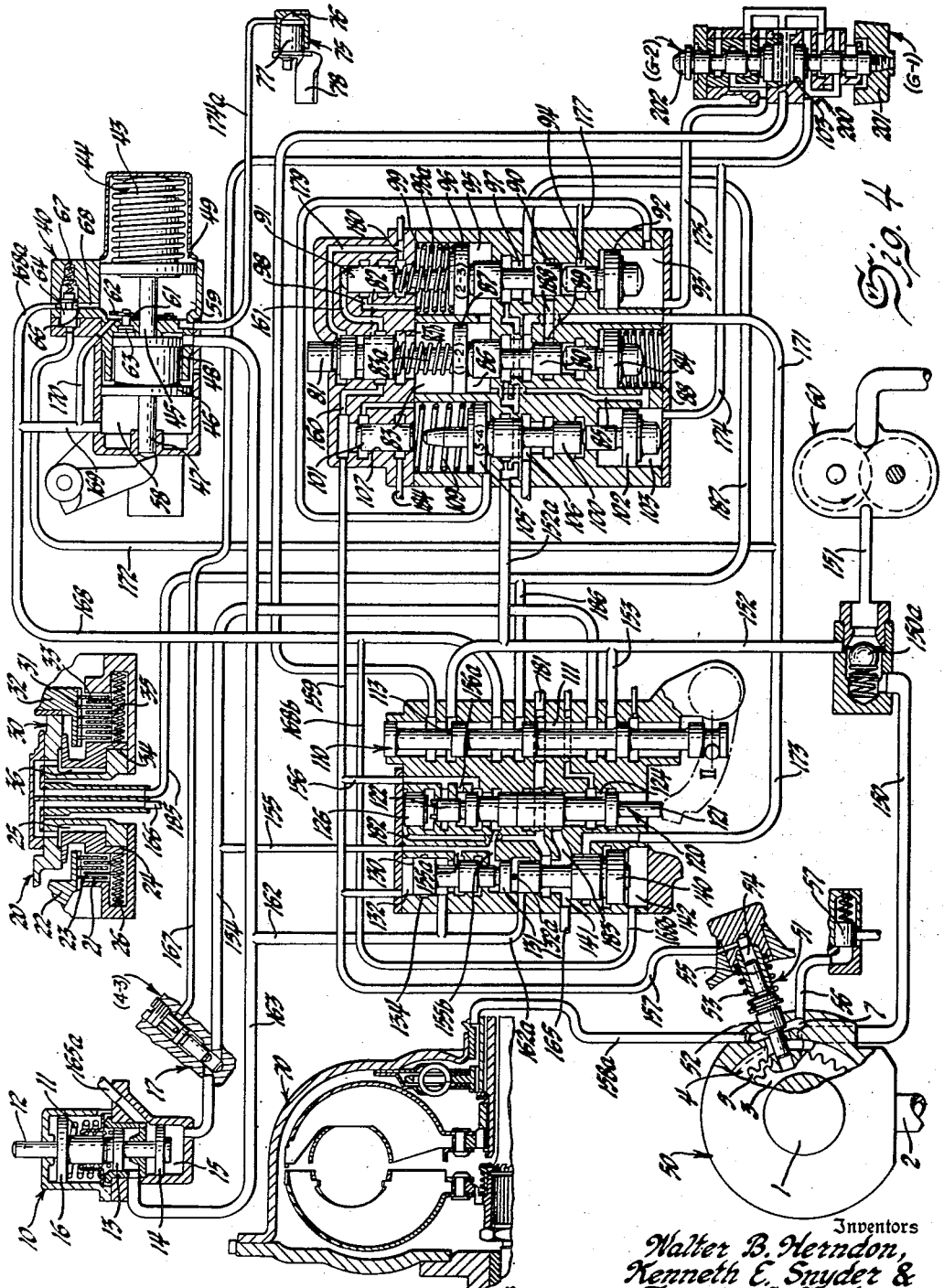

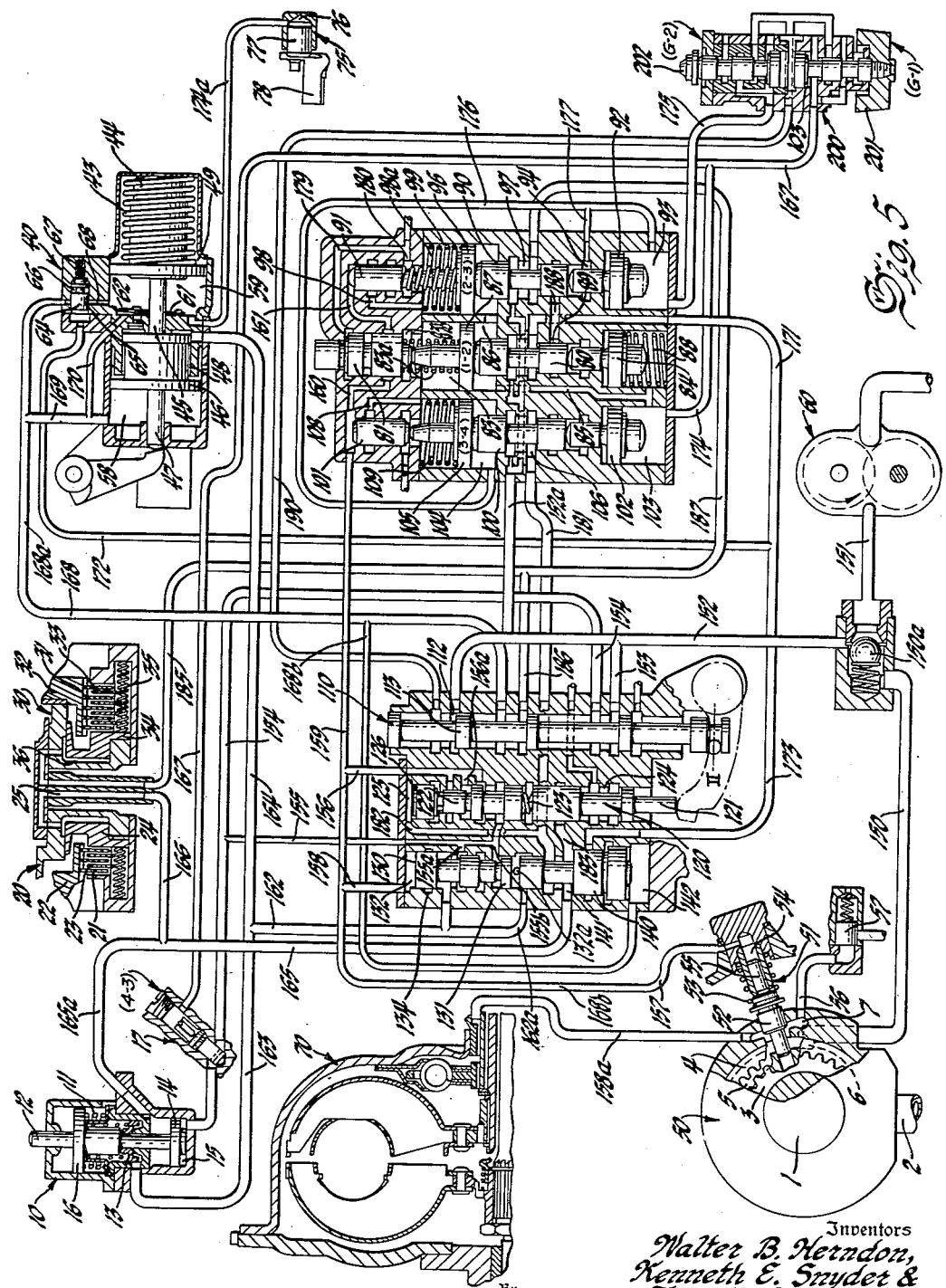

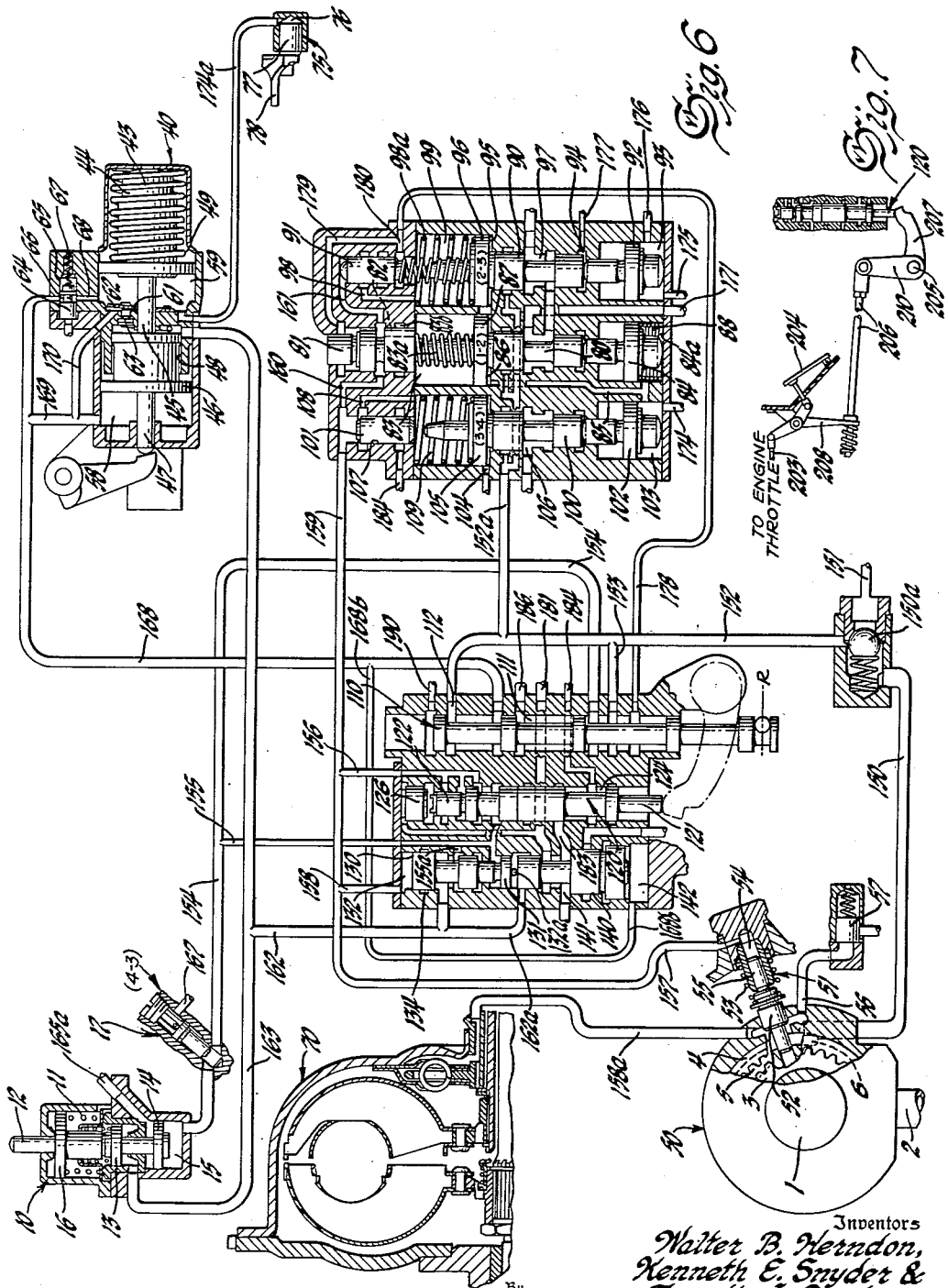

2,761,328

AUTOMATIC TRANSMISSION CONTROLS

Walter B. Herndon, Rochester, and Kenneth E. Snyder and Frank J. Condon, Detroit, Mich., assignors to General Motors Corporation, Detroit, Mich., a corporation of Delaware Application November 4, 1950, Serial No. 194,122

40 Claims. (Cl. 74—472)

This invention relates to controls for change speed gearing transmissions, and in particular to improved controls for such transmissions in motor driven vehicles. It is directed to improvements in control systems of the type wherein independently acting automatic and manual control members are coordinated to produce automatic selection of gear ratio in step ratio gearing. The invention represents a number of improvements in such control systems whereby shock occurring during ratio transitions may be minimized to provide for smooth shifting of the transmission gear ratio.

The invention provides for completely automatic shifting for improved smoothness, and for the elimination of clutch and brake grabbing in such shifting by modifying the line pressure to vary the clutch and brake torque capacity in accordance with the position of the vehicle throttle control means. The invention is particularly adapted for use in conjunction with step-ratio transmissions of the type having torque-overlap during the shift interval, as distinguished from transmissions of the type having a "neutral dwell" interval during shifting.

Among the novel features incorporated in this invention are: modification of line pressure in accordance with the position of the engine accelerator pedal, means effective to cause the transmission to normally start the vehicle in second gear, means effective to provide for more rapid shift into low gear and from reverse to low gear, means for yieldably biasing one of the control system valves to a predetermined position to eliminate harshness sometimes noticeable under starting conditions in the control system for which the present improvements are provided, and means for yieldably biasing another one of the control system valves to a selected one of its two positions to insure proper operation of the transmission during deceleration of the vehicle.

An object of this invention is to provide, in a transmission control system for a vehicle transmission, means governed by the position of the vehicle engine control mechanism for varying the torque capacity of the control system servo members whereby improved smoothness in shifting of the transmission is achieved.

A specific object of this invention is to provide in a motor vehicle transmission having drive means actuatable to establish drive connection between an engine drive shaft and a driven shaft and having fluid pressure responsive actuating means for applying and releasing said drive means, means for varying the fluid pressure supplied to said actuating means in accordance with variations in the rate of supply of fuel to said engine, to thereby vary the torque transmitting capacity of the drive means in accordance with engine torque output and to provide for smooth, gradual, and positive drive engagement irrespective of the torque output of the vehicle engine.

Another object of this invention is to provide in a fully automatic control system for a step-ratio transmission, means responsive to the position of the accelerator pedal for varying the pressure supplied to the control system whereby the torque capacity of shift clutches and brakes in the system is variably controlled to eliminate grabbing.

An additional object of this invention is to provide in a control system of the class described, means for modifying the fluid pressure in the system in accordance with the position of the accelerator pedal whereby the horsepower consumed in providing fluid pressure for the system is minimized.

A further object of this invention is to provide in a control system of the class described, a spring loaded shift valve biased to the position to cause the transmission controlled by the system to start normally in second gear, together with manually controllable means operative to shift the valve to a different position to cause the transmission to operate in low gear.

Another object of this invention is to provide in a control system of the class described having a pair of servo members adapted to be controlled by shift valves and having a double transition valve movable to selectively connect said servo members to said shift valves, a spring for biasing the double transition valve to hydraulically connect said servo members to one of the shift valves in the absence of fluid pressure influence upon the double transition valve.

A further object of this invention is to provide in a control system of the class described having a servo member adapted to apply a transmission control band under the influence of spring loading and to release the band under the influence of fluid pressure loading, a first fluid pressure discharge passage providing for restricted discharge of fluid for said servo member and a second fluid pressure discharge passage providing for fluid pressure discharge from the servo member, the second fluid pressure discharge passage being controlled by one of the system shift valves.

These and other objects and advantages of this invention will be apparent from the following description and claims taken in conjunction with the accompanying drawings, in which:

Figure 1 is a schematic diagram of the fluid pressure control system, the control system being illustrated in its "Neutral" condition of operation.

Figure 2 is a schematic diagram of the control system of Figure 1 illustrating the control system as operative in first gear, certain non-functioning portions of the system being omitted for simplicity.

Figure 3 is a schematic diagram of the control system of Figure 1, illustrating the control system as operative in second gear, certain non-functioning portions of the system being omitted for simplicity.

Figure 4 is a schematic diagram of the control system of Figure 1, illustrating the control system as operative in third gear, certain non-functioning portions of the system being omitted for simplicity.

Figure 5 is a schematic diagram of the control system of Figure 1, illustrating the control system as operative in fourth gear, certain non-functioning portions of the system being omitted for simplicity.

Figure 6 is a schematic diagram of the control system of Figure 1, illustrating the control system as operative in reverse gear, certain non-functioning portions of the system being omitted for simplicity.

Figure 7 is a schematic diagram of a control linkage for positioning a valve of the control system in accordance with movement of the vehicle engine control means.

Referring to the drawings, there is shown a control system for actuating fluid servo members of a step-ratio transmission of the type including front and rear planetary transmission units, each unit having a band and a clutch actuator adapted to be selectively applied to select a desired gear ratio in the transmission. The transmission per se forms no part of this invention and is well known in the art, as exemplified in the patents to Thompson, 2,204,872 issued June 18, 1940, Kelley 2,211,233 issued August 13, 1940, and Carnegie 2,221,393 issued November 12, 1940. Accordingly, it is not deemed necessary to illustrate the details of the transmission in the present application. The means for applying and releasing the clutches and bands of the step-ratio transmission includes a front band servo unit 10, front clutch servo unit 20, rear clutch servo unit 30, and rear band servo unit 40. The front band, and the front and rear clutch units are arranged to apply the front band and the clutch units, respectively, when fluid pressure is directed to the units. The rear band servo unit 40 is applied through the action of springs assisted by force exerted by fluid under pressure, and is released through the action of fluid pressure. In transmissions of the step-ratio type to which this control system is directly applicable, the following conditions of operation may occur: neutral, low, second, third and fourth forward speeds, and reverse. In neutral all bands and clutches are released, fluid pressure being directed to rear band servo 40, to release the band. In low, the front and rear bands are applied, both clutches being released. Fluid pressure, therefore, is directed solely to front servo 10, the rear band servo 40 being actuated through spring force to apply the rear band. In second, the front clutch and rear band are applied, and fluid pressure is directed to front clutch 20. In third, the front band and rear clutch are applied, fluid pressure being directed to servo units 10 and 30 to apply the same and to member 40 to release the rear band. For fourth speed, the front and rear clutches are applied, fluid pressure being directed to servo units 20 and 30 to apply the clutches and to servo unit 40 to release the rear band. In reverse, the front band only is applied, fluid pressure being directed to servo member 10 to apply the front band and to servo 40 to release the rear band.

A pump 50, which may be driven from the engine crankshaft, supplies fluid pressure to the control system whenever the vehicle engine is in operation. A pump 60, which may be driven from the vehicle drive shaft, is utilized to supply fluid pressure to the system when the vehicle is in motion, even though the engine may be inoperative. A check valve 150a is interposed between pump output lines 150 and 151 to prevent pump output from pump 50 from being directed to pump 60. Thus, the vehicle engine may be started as by pushing or towing the vehicle, the pump 60 serving to supply fluid pressure to a fluid coupling torus member 70 including an impeller and a rotor, the impeller being driven through the front unit by the engine output shaft.

The means for controlling selection of gear ratio in the transmission includes shift valves 80, 90, and 100, and a manually actuatable valve 110. The manually actuatable valve 110 is manually movable to one or another of a plurality of different positions which are indicated in the drawings by suitable indicia located in line with a groove in the exposed end of the valve. The valve positions are a neutral position N, a low range forward position I, a drive or high range forward position II, and a reverse position R. As hereinafter explained in detail, the shift valves 80, 90, and 100 operate automatically to select the transmission gear ratio, subject to initial control by the manual valve 110. A governor 200, driven by the vehicle drive shaft and responsive to vehicle speed, is arranged to direct fluid pressure to one side of the shift valves, the governor pressure being utilized to cause upshift, while a modified line pressure, hereafter termed throttle valve pressure, and determined in accordance with the position of the vehicle throttle, acts in opposition to the governor pressure, tending to cause downshift. Thus, the position of the shift valves depends upon both vehicle speed and the position of the vehicle throttle.

In control systems of the type to which this invention relates, the fluid pressure required by the servo members to insure proper application of the bands and clutches, without slipping and consequent undesirable wear of the clutch and band faces, depends upon the power being transmitted through the action of clutches and bands. In prior practice it has been common to design the pressure pump to provide for maximum pump pressure at all times, to assure the availability of sufficient pump pressure under conditions of extreme torque to prevent slipping of the clutches and bands. Thus, for example, if a line pressure of 85 pounds per square inch were required to properly apply the servo members under extreme torque (as with a wide open engine throttle) the pumps heretofore employed were designed to provide eighty-five pounds pressure at all times irrespective of torque capacity requirements. The provision of unnecessarily high line pressures under low torque conditions (as when the vehicle throttle is partially open) sometimes resulted in objectionable roughness in the application of the servo members noticeable during change of the transmission gear ratio. In addition, excessive horsepower was constantly consumed in building up unnecessarily high line pressures and then releasing unconsumed fluid under pressure through the pressure regulator valve.

By this invention, the line pressure is normally carried at the minimum pressure required to insure proper clutch and band operation under light load conditions (as with partially open engine throttle), and is automatically controlled by the position of the engine throttle, as controlled by the position of the accelerator pedal, to provide the increased pressure required under high load conditions. Otherwise stated, the torque transmitting capacity of the servo members is varied in accordance with the position of the accelerator pedal to provide smoother servo member application during shifting. Thus, the pressure regulator valve may be preset to normally provide sixty pounds line pressure, which pressure may be increased to eighty-five pounds, depending upon engine throttle position. In this manner, the lower pressure on the servo elements results in lower capacity and smoother engagement of the friction elements under part throttle conditions. Furthermore, less engine horsepower is consumed in building up unnecessarily high line pressures.

In control systems of the type to which this invention applies, a metered pressure varying in amount in accordance with the position of the vehicle accelerator pedal is utilized in the system as one of the forces applied to the system shift valves to determine the selection of transmission speed ratio as hereafter explained in detail. By using this already available meter pressure to regulate the pump pressure, the system pressure may be varied in accordance with the position of the vehicle accelerator pedal without adding any additional load to the accelerator pedal. Thus, the system pressure is controlled without increasing the resistance to movement of the accelerator pedal as would be true were springs or cams utilized to achieve this result.

Gear pump 50, driven by a shaft 1 connected to the vehicle engine, is provided with a suction line 2 leading to the transmission sump (not shown), a pair of gears 3 and 4 forming a pump pressure chamber 5. An outlet port in the form of a chamber 6 connects pressure chamber 5 to line 150 leading to the transmission control system. The pressure in the system supply line 150 is regulated by the line pressure regulator valve 51 which includes a pressure responsive member 52 subject to pressure in chamber 6 and spring loaded by means of a pressure regulator spring 53, the spring being calibrated to provide a minimum line pressure such as, for example, sixty pounds per square inch. Associated with the pressure regulator valve is a cylinder 54 adapted to receive a piston 55, which piston may act upon member 52 to force the member inwardly in assistance to spring 53 under the influence of fluid pressure introduced into cylinder 54.

A chamber 7 is adapted to receive fluid pressure upon raising of member 52 under influence of pressure in chamber 5. Fluid under pressure in chamber 7 is directed to pipe 158a leading to the fluid coupling torus 70. A by-pass relief valve 57 permits exhaust of excess pressure fluid from chamber 7 to the transmission sump (not shown), relief valve 57 being connected to chamber 7 by means of passage 56. When valve member 52 is in its "down" or closed position, member 52 blocks off chambers 5 and 6 from chamber 7, the entire pump output being fed to line 150. Upon raising of member 52 against the action of spring 53, or the combined effect of spring 53 and pressure fluid in cylinder 54 acting upon member 55, fluid pressure is released from chamber 6 and flows to chamber 7. Valve 57 acts to maintain a minimum pressure in torus 70 at all times. It will be noted that line pressure in lines 150 and 152 is regulated by valve 52 irrespective of whether pump 50, pump 60, or both pumps are simultaneously in operation. Thus, a single pressure regulator valve associated with one of the pumps is effective to regulate the pressure supplied to the system by the pair of independently operated pumps.

Means for regulating fluid pressure applied to cylinder 54 through a passage 157 comprises a pressure metering valve 120, the output of which is correlated to the position of the engine fuel valve as expressed by the position of the vehicle accelerator pedal, the valve 120 being hereafter termed a throttle or TV valve.

The TV valve 120 is controlled by a suitable linkage (see Figure 7) so as to be positioned in accordance with the position of the accelerator pedal. At closed vehicle throttle, as when the accelerator pedal is raised, TV valve 120 cuts off pressure supply line 155 from line 156 and line 157 leading to cylinder 54 so that the pressure regulator valve is controlled solely through action of spring 53. As the throttle valve 120 is moved in response to movement of the accelerator pedal, the valve opens to meter fluid pressure from line 155 into line 156 communicating with line 157 so that throttle valve pressure is directed to cylinder 54 of the pump pressure regulator valve. TV valve 120 is formed of two sections, 121 and 122, movable with respect to each other and having a spring 123 therebetween. Pump line pressure is directed to the TV valve 120 through lines 150, 151, 152, passage 153, through manual valve 110, and by way of lines 154 and 155 when valve 110 is in any position other than its neutral position N. Metered pressure, hereafter referred to as TV pressure, is directed to pump regulator plug chamber 54 by way of lines 156, 157; to a compensator valve cylinder 132 by way of line 158 communicating with line 157, and to shift valves 100, 80 and 90 through line 159, and passages 160 and 161. The TV valve acts to meter the pressure fed to passage 156 as follows: pressure applied to section 121, depending upon the position of the accelerator pedal, tends, through spring 123 to raise section 122 to its "up" or fully open position to admit full line pressure from passage 155 to passage 156. This output pressure in 156, acting through passage 156a, exerts a downward force upon section 122, thereby tending to move section 122 downwardly against spring 123 to cut off passage 156 from passage 155. With the accelerator pedal fully raised, passages 155 and 156 will be blocked off so that there is little or no TV pressure in line 156. With the accelerator pedal fully depressed, movement of section 121 will be effective to maintain full line pressure in passage 156, irrespective of the action of such pressure tending to close the valve. Intermediate these throttle positions, metered pressure in line 156 is effective to move section 122 downwardly against spring 123, the pressure necessary to cut off line 156 from 155 depending upon the position of the accelerator pedal.

It is important to note that, in the embodiment herein illustrated, TV pressure, while acting upon shift valve plugs 101 and 91, associated with valves 100 and 90, respectively, and tending to "downshift" the valves, does not act upon regulator 81 associated with shift valve 80 to tend to "downshift" valve 80. When shift valve 80 is in its "up" position as shown in Figure 3, TV pressure from line 159 and passage 160 merely passes around the regulator plug 81 through an annular groove in the valve casing to pass to channel 161 and to regulator plug 82. Valve 80 is "downshifted" by means of line pressure acting on regulator plug 81 as hereafter more fully explained. When the 1st to 2nd valve 80 has been "downshifted," as illustrated in Figure 1, TV pressure is admitted to chamber 83 by means of passage 82 to assist the line pressure to maintain the shift valve in its "down" position. 83b is an exhaust port which permits fluid pressure in chamber 83 to be exhausted when the valve is "upshifted."

It will also be noted that the admission of line pressure to passage 154 from passages 152 and 153 is determined by the position of manual valve 110. Thus, line pressure may be admitted to lines 154 and 155 when the manually operable valve 110 is positioned for low forward, high forward, and reverse, but is cut off from line 154 when the manual valve is placed in "neutral." With the manual valve in "neutral" as shown in Figure 1, any pressure which may have existed in chamber 54 and line 157 is exhausted to the transmission sump through passage 156, through section 122 of the TV valve, passages 155, 154, through manual valve 110, passages 186, 187, and 97 to exhaust port 97a of the 2nd to 3rd shift valve 90. Thus, TV pressure, depending upon the position of the vehicle accelerator pedal, will be directed to chamber 54 of the pressure regulator valve 51 at all times except when the manual valve is placed in its "neutral" position.

TV pressure, in addition to being directed to the pressure regulator valve and shift valves, as described, is conducted through passage 158 to a chamber 132 associated with a compensator valve 130 which valve acts to meter pump line pressure supplied through passage 155a the metered compensator pressure being varied in accordance with TV pressure and being directed to the front and rear band servo units through passage 162, and passages 163, 164, respectively, to aid in the application of these bands to prevent band slippage under high torque conditions of operation. Thus, an increase in TV pressure (due to depression of the vehicle accelerator pedal) applied to chamber 132 moves member 130 downwardly to admit line pressure from port 155a to line 162 thereby providing an increase in compensator pressure applied to the band servo actuating members. Pump input pressure from lines 154 and 155 is directed against compensator regulator plug 131 through port 155b, while compensator pressure is directed against the opposite side of the regulator plug through passage 162a as shown. As the compensator pressure acting upon regulator plug 131 increases in magnitude, the compensator valve is moved upwardly until the force exerted by compensator pressure acting upon plug 131 is balanced by the force of TV pressure acting on valve 130. Thus, compensator pressure opposes TV pressure in the controlling of the position of compensator valve 130.

A double transition valve 140 is disposed coaxially with compensator regulator plug 131, there being a pin 132a (see Figs. 2, 4–7) extending transversely of the bore in which the double transition valve is mounted. One end of a spring 133 bears against pin 132a while the other end presses against valve 140. Spring 133 thus tends to urge valve 140 to its "down" position. Compensator pressure from line 162a, determined by TV pressure as controlled by the position of the TV valve 120, normally tends to urge the double transition valve to its "down" position, but such compensator pressure may be absent under certain conditions of vehicle operation. For instance, if the operator removes his foot from the vehicle accelerator pedal, the compensator pressure may not be sufficient to urge the double transition valve "down."

The double transition valve 140 controls passages 165—166 for supplying fluid pressure to release the front band and apply the front clutch. The position of valve 140 in the valve bore is determined, in the absence of spring 133, by the opposing pressures of compensator pressure in line 162a and pressure in rear band release passage 168b. When there is no pressure in passages 168—168b, the double transition valve permits the 1st to 2nd shift valve 80 to supply fluid pressure through passages 171—173 to the front band release and front clutch apply passage 165. When pump line pressure exists in passages 168—168b to release the rear band, the double transition valve transfers connection of the front band release and front clutch apply passage 165 from the 1st to 2nd shift valve 80 to the 3rd to 4th shift valve 100.

In fourth speed the front band is released by fluid under pressure supplied through the 3rd to 4th valve 100. In third speed, the 3rd to 4th shift valve releases fluid from the front band release passage 165 so that the front band is applied. In both third and fourth speeds the rear band is released, but in first and second, the rear band is applied. Thus, when the transmission is in fourth or third speed, the double transition valve places the front band release and front clutch apply passage 165 under control of the 3rd to 4th shift valve. When the transmission is shifted from third to second or first speed, the double transition valve transfers control of passage 165 from the 3rd to 4th valve 100 to the 1st to 2nd valve 80. In third speed, the front band is applied and the front clutch released, but in second speed the front band is released and the front clutch is applied. This change is effected by supplying fluid under pressure to passage 165, through the 1st to 2nd valve and passages 171—173. It is therefore necessary for the double transition valve to move to its "down" or lower position to place passage 165 under control of the 1st to 2nd shift valve.

As heretofore stated, the position of the double transition valve is controlled by the opposing pressures of rear band release passages 168—168b and of compensator valve pressure. When the transmission shifts from third to second, the pressure in rear band release passage is released so that compensator pressure may move the double transition valve "down." However, if the throttle is closed, there may be no compensator pressure tending to move the double transition valve. Under these conditions, in the absence of spring 133, the front band will remain applied and the front clutch will remain released.

When the front band is applied the sun gear of the front planetary unit is held stationary and there is a gear reduction between the engine which drives the ring gear and the output shaft of the front planetary unit which is connected to the carrier of the front unit. When the front clutch is applied, the carrier and sun gear of the front unit are locked together so there is no reduction in this unit.

In the rear planetary unit the clutch is applied and the band is released in third speed, the reverse being true in second speed. The clutch, when applied, connects the output of the front planetary unit to the ring gear of the rear planetary unit to assist in direct drive through the rear unit. When the band of the rear unit is applied the ring gear of the rear unit is held stationary and there is a gear reduction in the rear unit. Hence, in changing from third to second speed, the rear planetary unit changes from direct drive to reduced speed drive.

If, upon change of the rear unit from a third speed to a second speed condition of operation, the front unit remains unchanged, the transmission as a whole will be placed in a first speed condition of operation rather than a second speed condition of operation so that a severe shock results. Spring 133 is effective to force the double transition valve to its "down" position, upon release of pressure in passages 168—168b, even though the accelerator pedal may be raised and no compensator pressure exists to urge the double transition valve down. The spring 133 therefore positively assures that the double transition valve will function properly upon shift from third to second speed by biasing the valve to its bottom or "down" position.

More particularly, in all conditions of operation except when the manual valve 110 is positioned in "neutral," compensator pressure is directed through passage 162a to provide a force in assistance to spring 133 tending to urge the double transition valve to its "down" position. As heretofore pointed out, in "neutral" manual valve 110 cuts off line 154 from line 152 so that no TV or compensator pressure exists in lines 156 and 162a respectively. The double transition valve 140 functions as follows: with manual valve 110 in "neutral," line pressure from line 152, lines 168 and 168b is fed to chamber 142, moving the double transition valve 140 to its "up" position. With manual valve 110 placed in "high" range position II, and the shift valves 80 and 90 positioned for first or low gear selection, pressure to line 168 and 168b leading to chamber 142 is cut off, so that compensator pressure in line 162a, aided by spring 133, moves the double transition valve 140 to its "down" position. When valve 140 is in its down position, lines 165 and 166 are exhausted to the transmission sump through passages 173—171 leading to the exhaust port 89 of 1st to 2nd shift valve 80. Compensator pressure is fed to the front and rear band servos through passages 162, 163, and 164, while line pressure is fed to the front band servo through passage 154.

With the shaft valves 80 and 90 positioned for second gear selection, no line pressure is fed to chamber 142, so that spring 133 and compensator pressure from line 162a maintain the double transition valve in its "down" position. When 1st to 2nd shift valve 80 is in its "up" position, thereby cutting off communication from line 171 to the exhaust port 89 and directing line pressure from line 152a to lines 171, 172, and 173, the double transition valve 140 is in its "down" position and fluid pressure is admitted from line 173 to lines 165 and 166. Chamber 142 and lines 168 and 168b are placed in communication with line 186 by manual valve 110. These lines are all exhausted to sump through lines 186, 187 leading to exhaust port 97a of 2nd to 3rd shift valve 90.

In third speed, the double transition valve is moved to its "up" position through action of line pressure in chamber 142, thereby cutting off line 165 from line 173. Lines 165 and 166 are exhausted to sump through chamber 141 of the double transition valve and line 181 leading to exhaust port 106a of 3rd to 4th shift valve 100.

In fourth speed, all of the shift valve exhaust ports are blocked off, the shift valves being in the up position. Fluid pressure is directed to the servo units as hereafter more fully explained. Line pressure in chamber 142 maintains the double transition valve in its "up" position, thereby blocking off line 165 from line 173.

In reverse, line pressure is directed from line 152 through port 112 of the manual valve to lines 168 and 168b and hence to chamber 142, placing the double transition valve in its "up" position cutting off line 165 from line 173. With all of the shift valves in the "down" position, the shift valve exhaust ports 89, 97a, and 106a are uncovered to permit exhaust of pressure in all passages communicating therewith. Thus, lines 186, 185, and 187 are exhausted to sump through exhaust port 97a of shift valve 90. Lines 173, 172, and 171 are exhausted through exhaust port 89 of 1st and 2nd shift valve 80. Lines 165, 166 are exhausted by way of chamber 141 of the double transition valve 140, passage 181 and exhaust port 106a of 3rd to 4th shift valve 100.

Operation of the front band servo

Actuation of the servos is dependent upon the position of manual control valve 110. When the control valve 110 is in its neutral position, no oil pressure is directed to the front servo. Under this condition of operation, a retracting spring 11 forces the band apply piston assembly, consisting of stem 12 and pistons 13 and 14, to its bottom position so that the band actuated by the front servo by means of stem 12 is released.

With the manual valve 110 in either the "high," "low," or "reverse" position, pump pressure is directed through line 154 to cylinder 15 to move piston 14 and stem 12 to apply the front planetary unit band. Compensator pressure in passage 163 is applied beneath piston 13 to assist main line pressure, applied through line 154 to piston 14, to prevent the front band from slipping under heavy acceleration. Except when the manual valve 110 is placed in "neutral," compensator pressure is always present when there is any carburetor throttle opening as expressed by movement of the accelerator pedal and the linkage to throttle valve 120. Compensator pressure, being dependent upon the output of TV valve 120, increases with the carburetor throttle opening. Thus, the compensator pressure constitutes a supplemental pressure, additional to line pressure, the magnitude of which is controlled by the position of the vehicle accelerator pedal for assisting line pressure in applying the bands to prevent slipping thereof under high engine torque output.

To release the front band, pump pressure is applied to the upper sides of pistons 14 and 16 through line 165a and hollow valve stem 12. The area of these two pistons is greater than the area of pistons 14 and 13, and the apply piston assembly is moved to its released position.

As will be hereafter explained in further detail, automatically derived variable governor pressures are used to obtain automatic shift. A valve 17, hereafter termed a fourth to third speed downshift valve, controls line 154 leading to the chamber 15 beneath piston 14. At car speeds below a predetermined speed, for example, twenty-five miles per hour, pump pressure from line 154 under the valve 17 keeps the valve raised so that the entire passage leading to cylinder 15 is open. At car speeds above twenty-five miles per hour, governor pressure from line 167 applied to the top of the valve 17 is sufficient to move the valve to restrict oil flow, which action delays front band application and permits the engine speed to increase before the front unit goes into reduction during the fourth to third speed downshift. This same condition exists upon full throttle second to third speed upshifts described below.

*Operation of the rear band servo*

The rear band servo apply unit 40 is applied through action of springs 41, 42, and 43, which springs act upon accumulator piston 44, the stem 45 of which contacts a booster piston 46, applying the rear planetary unit band (not shown) through stem 47.

As hereafter more fully explained, compensator pressure from line 164 is applied to chamber 48 and through hollow stem 45 to cylinder 49 to assist the servo springs to apply the rear band and thus prevent the rear band (not shown) from slipping. As heretofore explained, compensator pressure is present whenever there is any carburetor throttle opening, and increases with the throttle opening, except when manual valve 110 is placed in "neutral."

Pump pressure is applied through lines 168, branch lines 169 and 170 to chambers 58 and 59, respectively, thereby acting upon pistons 46 and 44 to release the rear band (not shown), the rear band being released in neutral, third and fourth forward speeds, and reverse. The force applied is greater than the force of the servo springs plus compensator pressure so that the servo pistons are moved to release the band.

An accumulator check valve 61 in the rear servo controls the passage through which fluid under pressure flows as it is directed to cylinder 59. Fluid passing through the check valve from line 170 lifts the check valve 61 off its seat, thereby allowing the fluid under pressure to flow freely to release the rear band against the action of the servo band apply springs.

The check valve operates in two different manners as follows:

On a closed throttle downshift (as would occur when the manual valve is positioned for "low" range of operation to provide engine braking in descending a hill), when the pump pressure previously applied to the face of piston 44 opposite the servo apply springs is being released through line 169, the check valve is returned to its seat causing the fluid under the accumulator piston 44 to pass through a relatively small port 62 in the check valve, thereby delaying the application of the rear band.

With an open throttle downshift (as would occur when the vehicle is under heavy load or climbing a hill), compensator pressure from line 164 is effective in cylinders 48 and 49 and also on the end of check valve plunger 63. When the pressure applied in cylinder 59 is released, the compensator pressure applied on the check valve plunger forces the plunger against the valve to hold the valve off its seat so that fluid under pressure in the chamber 59 at the face of the accumulator piston 44 is allowed to exhaust freely so that the rear band may be quickly applied through action of the springs.

As was explained above, check valve 61 is seated under closed throttle conditions in order to delay application of the rear band. Under certain conditions of vehicle operation, this delay in applying the rear band to shift into low range of gear ratio is highly undesirable. For example, it is sometimes highly desirable to shift quickly into low range in order to obtain maximum engine braking. In going over the brow of a hill, the vehicle may be operating at relatively high speed with closed throttle when the operator shifts the manual valve 110 to "low" position. Under these conditions, if application of the rear band is delayed, the vehicle may travel several car lengths before the shift to low could occur. In order to obviate this undesirable delay in shifting under closed throttle conditions of operation, a by-pass exhaust valve plunger 64 is provided. As shown, valve plunger 64 is slidably positioned in a valve bore 65, the plunger having an annular groove 66 thereon. A spring 67 normally biases the plunger to align groove 66 with auxiliary exhaust passage 68. A pressure line 172 connects the by-pass valve to the first-to-second shift valve 80 through line 171 so that operation of the by-pass valve is controlled by the position of the shift valve. Thus, whenever shift valve 80 is in its upper position, communication between line 152a and line 171 is established so that pressure is admitted to line 171 and through line 172 to the by-pass valve plunger, moving the plunger against spring 67 to cut off the by-pass exhaust passage. When shift valve 80 is in the bottom position, or "down" position, the supply of fluid pressure to line 171 is cut off by the shift valve, thereby permitting spring 67 to move plunger 64 to open the auxiliary by-pass passage by aligning annular groove 66 with passage 68. Pressure previously existing in lines 171 and 172 is exhausted through exhaust port 89 of shift valve 80.

It will thus be understood that valve 64 is controlled by 1st to 2nd shift valve 80 so that whenever the transmission is conditioned for second speed, or a higher speed, the valve closes and retards release of fluid from the rear band servo and consequently retards application of the band, but when the 1st to 2nd shift valve is in its low speed position valve 64 is open, permitting rapid discharge of fluid pressure from the servo member, thereby accelerating the application of the rear band.

As shown in Figures 1, 4, 5, and 6, a reverse blocker mechanism 75 is provided, the blocker piston 77 being located in the reverse bracket assembly. The function of this blocker is to prevent engagement of the reverse anchor (not shown) into the reverse internal gear (not shown) until the rear band is applied to the drum to stop the internal gear from turning. Rear band release pressure is directed from chamber 59 through passage 174a to chamber 76 behind the piston 77 to hold the piston and blocker lever 78 out, so that if the manual selector lever is moved from "neutral" to "reverse" position without attempting to stop in the "low" range position, the reverse crank (not shown) will strike the blocker lever 78 preventing a clash between the anchor and internal gear. Therefore, the operator must delay shifting into reverse until the rear band is engaged. It will be understood that it is desirable that the fluid pressure in the rear band servo unit and the reverse blocker be exhausted rapidly in order to quickly free the reverse blocker for shifting into reverse. The rear servo by-pass valve 64 permits this rapid fluid pressure discharge so that the vehicle may be rocked by rapid shift between low speed forward and reverse. A reverse pawl mechanism of the type employed in conjunction with the blocker is shown in the patent to Kelley 2,211,233, issued August 13, 1940. In the Kelley patent, however, there is no blocker for the reverse pawl or means for rapidly exhausting the fluid pressure acting upon the blocker piston.

*Front clutch servo unit*

The front clutch servo unit includes a plurality of clutch plates 21 carried by a transmission drum member 22 which plates extend inwardly and are adapted to engage a plurality of outwardly extending clutch plates 23 carried by a drum piston 24 rigidly secured to the carrier of the front planetary unit. Piston 24 is slidably positioned in a cylinder 25 and is moved under influence of fluid pressure to cause the clutch plates to be engaged. A spring 26 acts to move piston 24 to permit disengagement of the clutch plates when fluid pressure is exhausted from cylinder 25. Fluid pressure is admitted to cylinder 25 through passage 166 communicating with passage 165. Passage 165 communicates with a bore 141 of the double transition valve 140. A passage 181, controlled by the double transition valve 140, connects bore 141 to bore 106 of shift valve 100. A branch passage 182 communicating with passage 181, leads to chamber 125 above TV regulator plug 126. Additional passages communicating with bore 141 of the double transition valve 140 include passage 173 communicating with passages 171 and 172 and passage 183 communcating with chamber 124 of TV valve 120. A passage 184 connects chamber 124 of TV valve 120 to the bore 107 of regulator plug 101 associated with shift valve 100.

*Rear clutch servo unit*

Rear clutch servo unit 30 is similar to front servo unit 20 in that there are provided a plurality of clutch plates 31 carried by a transmission drum 32 adapted to engage clutch plates 33 carried by a drum on the output shaft of the front planetary unit. The clutch plates 31 and 33 are at times pressed into engagement by a piston 34. A spring 35 serves to move piston 34 to permit disengagement of the clutch plates upon release of fluid pressure from cylinder 36. Fluid pressure is admitted to chamber 36 (to cause piston 34 to effectuate engagement of the clutch plates) through a passage 185, which passage communicates with bore 111 of manual valve 110 through branch passage 186 (see Figure 1) and with chamber 97 of shift valve 90 through passage 187. With the 2nd to 3rd shift valve positioned as shown in Figure 1, a passage 188 connects exhaust port 97a and chamber 97 of shift valve 90 to exhaust port 89 of shift valve 80, admission of fluid to exhaust port 89 being controlled by the position of shift valve 80.

Line 152 terminates at chamber 112 of manual valve 110, the latter chamber being adapted to be placed in communication with passage 190, which passage directs pump pressure to governor 200. Admission of pump pressure to the governor is controlled by the position of land 113 of manual valve 110 in chamber 112. Passages 168, 168a, and 169 likewise communicate with chamber 111 of manual valve 110 and are controlled by the position of the manual valve with respect to chamber 111. A branch passage 168b establishes communication between passage 168 and cylinder 142 beneath double transition valve 140.

Admission of pressure to the rear clutch is controlled in accordance with the position of valve 110 in bore 111 and in accordance with the "up" or "down" position of the 2nd to 3rd shift valve. Thus, with the manual valve 110 positioned to condition the transmission for "neutral" operation as illustrated in Figure 1, the intermediate land of valve 110 cuts off fluid flow between passage 152 and passages 185—186. At the same time, shift valve 90 is in its "up" position, thereby exhausting any fluid previously admitted to line 185 through passage 187 and exhaust port 97a.

With the manual valve 110 positioned for low range operation of the transmission, and with the 2nd to 3rd shift valve in its "down" position, as illustrated in Figure 2, passage 186 leading to passage 185 is cut off from pressure in line 152 by the manual valve. Passage 185 is exhausted through the 2nd to 3rd shift valve 97a as was the case when the manual valve was positioned for "neutral" operation. Thus, engagement of clutch 30 is prevented in both "neutral" and "low" range condition of operation, regardless of the position of the 1st to 2nd shift valve.

With the manual valve positioned for "high" range operation, and with 1st to 2nd shift valve positioned for second speed, as shown in Figure 3, admission of pressure to passage 186 (and hence to passage 185) is prevented so that the rear clutch cannot be engaged. Passages 186, 185, and 187 of Figure 1 are exhausted through exhaust port 97a of the 2nd to 3rd shift valve.

With the manual valve positioned for "high" range operation, and the 2nd to 3rd shift valve positioned for third speed operation, as shown in Figure 4, fluid pressure is admitted to the rear clutch servomotor from line 152 by way of branch passage 152a, through an extension of passage 152a leading to chamber 97 of the 2nd to 3rd shift valve, and through passage 187 leading to passage 185 to apply the rear clutch.

With the manual valve positioned for "high" range operation and the shift valves positioned for fourth speed operation, as illustrated in Figure 5, fluid pressure is admitted to the rear clutch servomotor in the same manner described in connection with the third speed condition of operation.

With the manual valve positioned for reverse condition of operation, as shown in Figure 6, line 186 is blocked off from passage 152, lines 186, 185, and 187 of Figure 1 being exhausted through exhaust port 97a of Figure 1 of the 2nd to 3rd shift valve.

Thus, rear clutch 30 can be engaged only when the manual valve is positioned for high range operation and when the 2nd to 3rd shift valves are positioned for third or fourth speed condition of operation.

*Governor pressure*

In addition to the pump, throttle valve TV and compensator pressures discussed above, there are two governor pressures utilized in the control system. These pressures are hereafter termed and referred to as G–1 and G–2 pressures. Governor pressure is utilized to shift the shift valves 80, 90, and 100 in opposition to the TV pressure and the spring loading of the valves, in addition to being applied to the 4th or 5th downshift valve 17 as heretofore explained. The governor 200 is of the centrifugal type, being driven from the transmission output shaft (not shown). Two governor pressures are supplied; G–1 being controlled by the position of the large governor weight 201 and G–2 being controlled by the position of the small governor weight 202. The pressure output of the governor increases with increase in speed of rotation of the vehicle output shaft, the maximum pressure output being that of the pressure of fluid supplied by pipe 190. The governor section controlled by large weight 201 operates to supply maximum pressure at relatively low vehicle speeds while the G-2 pressure controlled by weight 202 reaches maximum pressure at relatively high vehicle speeds. These two governor pressures work against shift valve governor plugs 102, 84, and 92. The governor itself does not form a part of this invention and need not be discussed in further detail, except to state that the governor pressures increase with speed of rotation of the governor body. A satisfactory form of governor is shown and discussed in the patent to Earl A. Thompson 2,204,872 issued June 18, 1940.

The G-1 pressure is directed, through conduit 174 to chamber 103 beneath governor plug 102 of shift valve 100 and through passage 85 to chamber 86 beneath piston 87 of shift valve 80, which latter valve controls shift from first to second speed. With the manual valve 110 placed in "neutral" as indicated in Figure 1, line pressure from lines 152, 153, and 178 is directed through passage 179, thereby acting upon regulator plug 81, tending to force valve 80 to its "down" or first speed position. At the same time, pressure input to the governor through line 190 is cut off by land 113 of the manual valve. Thus, no governor output pressure is available, with the manual valve in "neutral," to counteract the effect of line pressure on regulator plug 81. Line pressure therefore overcomes the effect of spring 88 to move the valve to its first speed position indicated in Figure 1.

With the manual valve positioned for "low range" operation, the shift valve 80 may assume either its "down" position, as shown in Figure 2, or its "up" position as shown in Figure 3. In starting the vehicle, G-1 pressure acting in chamber 86 and beneath governor plug 84 is relatively low, due to low speed of the vehicle.

In Figure 2, line pressure from line 178 and passage 179 acts upon regulator plug 81 to force shift valve 80 to its low or first speed position. Upon movement of the valve to its "down" position, TV pressure from line 159 and passage 160 passes through port 82 to chamber 83, the TV pressure thereby tending to maintain the shift valve 80 in its "down" position after it has first been caused to downshift through action of line pressure. 83b is an exhaust port which permits exhaust of fluid pressure from chamber 83 when the shift valve is caused to upshift.

Thus, TV pressure plus line pressure acting upon regulator plug 81 sufficient to overcome spring 88 and G-1 pressure tending to up-shift valve 80.

With the manual valve 110 positioned for "high range" operation, line pressure in passage 153 is cut off from passage 178, passage 178 being exhausted to the transmission sump through manual valve exhaust port 114 (see Figure 3). Since no line pressure is applied to regulator plug 81 tending to downshift valve 80, the force of spring 88 is sufficient to maintain shift valve 80 in its "up" or second speed position. Thus, whenever the manual valve 110 is positioned for high range of operation, as is normal in the operation of the vehicle, the 1st to 2nd shift valve is maintained in its "up" position, thereby conditioning the transmission for normal second speed operation in starting the vehicle.

The position of valve 110 for a "low" or first speed start is illustrated in Figure 2. As shown in Figure 2, line pressure is admitted from line 153 to line 178, hence through passage 179 to regulator plug 81, thereby forcing shift valve 80 to its bottom position against the force of spring 88. At starting conditions, governor output to line 174 of Figures 1 and 2 and chambers 84a and 86 will not be sufficient to maintain the valve in its "up" position to cause second speed start.

G-2 pressure is directed through passage 175 to cylinder 93 beneath governor plug 92 and therefrom, through passage 176 to chamber 104 beneath piston 105 of shift valve 100, and through passage 177 to chamber 94 common to one end of shift valve 90 and the adjacent end of governor plug 92.

The governor pressures, determined by vehicle speed, therefore, tend to cause upshift of the shift valves in opposition to TV pressure applied to regulator plug 101 and regulator plug 91, and in opposition to pump pressure applied to the 1st to 2nd shift valve 80 regulator plug 81. Pump pressure is directed to regulator plug 81 through lines 178—179, controlled by manual valve 110. A passage 180 admits line pressure from passage 178 to the side wall of regulator plug 91.

By providing a control system having the 1st to 2nd shift valve spring biased for second speed start when the manual valve 110 is placed for "high range" of operation as is normally the case in operating the vehicle, a smooth acceleration of the vehicle is accomplished without spinning the vehicle wheels and without excessive engine speed due to gear reduction in the transmission. At the same time low speed start is readily available where maximum power and acceleration is desired by simply placing the manual valve for "low" range operation.

*Hydraulic control (conditions of operation)*

Having made a general disclosure of the fluid pressure control system, the manner in which the pressures are applied in the various speed ranges are herein explained in greater detail.

*Neutral—engine running*

The control system of Figure 1 illustrates the operation of the system with manual valve 110 positioned in the neutral position. In this condition of operation, front band servo unit 10 and front and rear clutch servo units 20 and 30 are free of fluid pressure and are each released through action of the release springs in the respective units. Pressure in chamber 15 of the front band servo is released through passages 154, 186, leading to exhaust port 97a of shift valve 90. Pressure in chamber 25 of the front clutch servo is released through pipes 166, 165, passage 181, and exhaust port 106a of shift valve 100. Pressure in chamber 36 of the rear clutch servo is released through line 185, 187, and exhaust port 97a of shift valve 90. Manual valve 110 is positioned to direct pump pressure from line 152 to line 168 and thus to cylinders 58 and 59 of rear band servo unit 40 through branch passages 169 and 170, respectively, to release the rear band servo unit. Since all of the clutch and band servo units are now conditioned to release the bands and clutches of the transmission, no power can flow through the transmission. Pump pressure is also directed through branch pipe 168b to cylinder 142 of the double transition valve 140, thereby raising valve 140 to block off line 173 and to establish communication, through valve chamber 141, between line 165 and passages 181, 182, and 183. Line pressure is also directed from line 153 through line 178, through port 180 to the chamber 99 of shift valve 90, and through passage 179 to the top of 1st to 2nd shift valve regulator plug 81 forcing valves 80 and 90 to "low" or first speed position. Pump pressure is also directed through branch line 152a to the ports of each of the shift valves as shown. The oil pressure at the shift valve ports, however, has no function when the transmission is in neutral. Fluid pressure is directed to the fluid coupling or torus 70 through line 158a at all times when the engine is running or the vehicle is in motion. Compensator pressure from lines 163, 164 and 162 is exhausted to the transmission sump through exhaust port 134 when the compensator valve is fully raised as illustrated in Figure 1.

*First gear*

In order to obtain proper reduction for first gear, both clutches are released, and the front and rear band servos are positioned to apply the front and rear bands (not shown). With manual valve 110 positioned for low range of operation, as illustrated in Figure 2 of the drawings, pump pressure from line 153 is directed through lines 178 and 179 to the top of 1st to 2nd shift valve regulator plug 81, thereby maintaining shift valve 80 in its bottom or low position against the force of spring 88. Pump pressure is conducted from pipe 153 through the manual valve 110 and by line 154 to cylinder 15 of front band servo unit 10 to apply the front band. Branch line 155 directs pump pressure to conpensator valve 130 and to TV valve 120. TV output pressure, which depends upon the position of the vehicle accelerator pedal, is directed through lines 156 and 157 to cylinder 54 of the pump pressure regulator valve 51, through pipe 158 to compensator valve 130, through conduit 159 to the top of 3rd to 4th regulator plug 101, through passages 160 and 161 to the top of 2nd to 3rd regulator plug 91, and depending upon the position of regulator plug 81, through passage 82 to cylinder 83 of the 1st to 2nd shift valve 80. Thus, TV pressure acts to maintain shift valve 80 in its low or down position after the valve has been moved to the down position through action of line pressure applied to regulator plug 81. TV pressure in chamber 83 plus line pressure acting upon regulator plug 81 is sufficient to overcome the force of spring 88 and governor pressure in chamber 86 and acting beneath governor plug 84 to prevent upshift at low vehicle speeds. Compensator pressure from compensator valve 130, and dependent upon TV pressure directed to valve 130 through line 158, is directed to the front and rear servos 10 and 40 through line 162 and branch lines 163 and 164, respectively, to assist in applying the bands. While compensator pressure is also directed through branch line 162a to the chamber between the compensator valve and double transition valve 140, it is important to note that a spring 133a (see Fig. 1) is positioned between the valve 130 and regulator plug 131 to rapidly return compensator valve 130 to its "up" position upon drop of TV pressure in chamber 132.

In systems of this type heretofore employed, the positioning of the compensator valve depended solely upon differential pressure, upon release of TV pressure from chamber 132, to return it to a position to cut off compensator pressure to front band apply passage 163. Specifically, compensator pressure in line 162a, acting on the bottom of regulator plug 131 was utilized to raise the compensator valve to its "up" position upon release of TV pressure in chamber 132 in order to cut off passages 162 and 163 from line 155 and port 155a, and to permit exhaust of pressure from lines 162 and 163 through exhaust port 134 of the compensator valve. It was thus possible for the compensator valve to become lodged in its "down" position so that it would not properly meter compensator pressure and exhaust lines 162 and 163. Spring 133a, interposed between regulator plug 131 and compensator valve 130 acts to yieldably yet positively bias the compensator valve to its "up" position so that passages 162 and 163 may be exhausted upon release of TV pressure from chamber 132.

A spring 133 is provided to yieldably bias the double transition valve 140 to its "down" position in order to assure that the double transition valve will connect passage 165 to passage 173 when line pressure in chamber 142 is exhausted.

More specifically, it has been found in practice that under certain conditions of vehicle operation, in the absence of a means for positively biasing the double transition valve to its "down" position, the engine may tend to momentarily speed up or run away due to absence of engine loading. If the engine is allowed to speed up unnecessarily, an undesirable jerk is felt when the band is engaged to start the vehicle. For example, assuming the vehicle accelerator pedal to be released so that TV and compensator pressure are cut off, the double transition valve may become lodged in its "up" position even though no line pressure is being fed to chamber 142 through line 168b. If the vehicle is conditioned for normal second speed start and the double transition valve is in its "up" position, line pressure from lines 171—173 will be cut off from line 165 by the double transition valve so that the front clutch cannot be engaged. Since both the front band and front clutch are momentarily disengaged, the engine is released of its load and tends to speed up. Upon depression of the accelerator pedal, TV pressure will force the double transition valve down, admitting line pressure from line 173 to 165, to engage the front clutch. Due to excessive engine speed the clutch engages with an undesirable jerk. By utilizing spring 133 to yieldably bias the double transition valve to its "down" position, undesirable unloading of the engine is prevented so that it cannot run away prior to engagement of the front clutch.

G–1 governor output pressure, dependent upon vehicle speed, is directed through passage 174 to chamber 103 beneath governor plug 102, to chamber 84a beneath governor plug 84, and through passage 85 to chamber 86 beneath valve piston 87. Chambers 86 and 95 of 2nd to 3rd shift valve 90 are connected so that the compensator pressure tends to raise both valves to the "up" position. The 1st to 2nd shift valve 80 is positioned in its down position through action of line pressure, and upon attaining its down position, TV pressure in chamber 83 acts to assist line pressure to maintain the valve in this position. Spring 88 plus G–1 pressure in chambers 84a and 86 tend to overcome the line pressure and TV pressure to move the shift valve to its up or second position. Thus, at vehicle speeds above a predetermined speed, for example, 18 miles per hour, G–1 pressure acting in chambers 84a and 86 will be sufficient to place shift valve for second gear operation, even though manual valve 110 is positioned for low range operation, while at speeds below the predetermined speed, line pressure will be sufficient to overcome spring 88 to move valve 80 to its low, or first gear position.

With shift valve 80 in its down or low position, pump pressure from line 152a is cut off from lines 171, 172 and 173 (see Figure 1) thereby allowing spring 67 of rear servounit 40 to move valve plug 64 to open auxiliary discharge passage 168a for rapid exhaust of chamber 59, so that the band-apply springs of the rear servo may quickly actuate the rear servounit to apply the rear band. Thus, with the front and rear servos positioned as shown, both bands are applied and the transmission is in first or low gear. G–2 pressure is directed through passage 175 to chamber 93 beneath governor plug 92, and therefrom through passage 176 to chamber 104 beneath 3rd to 4th shift valve piston 105, and through line 177 to chamber 94 of shift valve 90. At low vehicle speeds the G–2 pressure is not sufficient to cause shifting of the shift valves.

*Second gear*

The condition of the valves of the control system after upshift to second gear is illustrated in Figure 3. In second gear the front clutch and rear band are applied, while the front band and rear clutch are released. As the vehicle speed increases, G–1 output pressure in line 174 also increases until the G–1 pressure applied in chamber 84a, and through passage 85 in chamber 86, plus the action of spring 88, is sufficient to overcome the combined effect of line pressure from line 179 acting upon regulator plug 81, of TV pressure from line 160 and passage 82 applied to chamber 83, and of spring 83a, whereupon shift valve 80 moves to its up or second gear position. In this position, valve 80 connects line 152a to line 171, whereupon pump pressure is conducted through lines 171 and 173 to double transition valve 140 which has previously been pushed to its open position by spring 133 and compensator pressure in line 162a. Pump pressure then passes through double transition valve 140, and thence through passages 165 and 166 to cylinder 25 of front clutch servo 20 to apply the clutch. At the same time, pump pressure is directed through branch 165a to release the front servo. Pressure from line 165a acting upon piston 14, and through hollow stem 12 acting upon piston 16, plus the force of release spring 11, overcomes the apply pressure supplied by line 154, releasing the front band servounit during the same interval that the front clutch is engaged so that torque may temporarily be transferred through both the band and clutch as shifting occurs. Application of the front clutch servounit, with the rear band servounit still applied by spring pressure, changes the transmission gear ratio from first to second speed.

Third gear

In third gear the front band and rear clutch are applied, while the front clutch and rear band are released. The condition of the control system on upshift from second to third gear is illustrated in Figure 4. To permit shifting to third and fourth gears, the manual valve 110 must be positioned to the drive position illustrated in Figure 4. As vehicle speed increases, governor output pressure in lines 174 and 175 increases. G–1 pressure, from line 174 applied to the 1st to 2nd shift valve 80, as explained in connection with the upshift to second gear, maintains 1st to 2nd shift valve 80 in its up or second speed position. G–2 pressure in line 175 is applied to chamber 93 of 2nd to 3rd shift valve 90, while G–1 pressure is applied from chamber 86 to chamber 95 beneath 2nd to 3rd shift valve piston 96. At this time TV pressure from line 159 and passage 161, applied to regulator plug 91, and through passage 98 to chamber 99 at the upper face of piston 96 together with spring 98a, exert force to maintain the 2nd to 3rd shift valve in its down position. When the governor pressure becomes sufficient, shift valve 90 is moved to its up position, thereby permitting pump pressure from line 152a to pass through lines 187 and 185 to rear clutch servocylinder 36, applying the rear clutch. At the same time, pressure in line 185 is directed through line 186, hence through the manual valve to line 168 and through lines 169 and 170 to release the rear band.

At the same time, line pressure is applied through line 168b to chamber 142 of double transition valve 140, moving the transition valve to cut off lines 165, 165a, and 166 from line pressure. Pressure previously existing in the front clutch servounit is released through line 181 and exhaust port 106a of shift valve 100, thereby releasing front servoclutch unit 20. Fluid pressure is directed to front band servounit chamber 15 through line 153, manual valve 110, and line 154 to apply the front band. With the front band and rear clutch servounits positioned as shown, the transmission is in third gear.

Fourth gear

In fourth gear, the front and rear clutches are applied while the front and rear bands are released. The operation of the control system to place the transmission in fourth gear is illustrated in Figure 5.

As the vehicle speed increases, governor pressure increases, resulting in increased governor pressures against the 3rd to 4th shift valve 100, G–1 pressure being applied through line 174 to chamber 103 at the lower face of governor plug 102, and G–2 pressure being applied through line 175 and line 176 to chamber 104 beneath the 3rd to 4th shift valve piston 105. When force exerted by the governor pressures applied exceeds the effect of TV pressure applied through line 159 to regulator plug 101, and applied to the chamber at the top of piston 105 through passage 108, plus the effect of spring 109, the shift valve 100 is moved to its up position, permitting pump pressure to pass from line 152a, through the shift valve to line 181, and then through double transition valve 140 to lines 165, 166, and 165a, releasing front band servo unit 10, and applying forward clutch servo unit 20. The double transition valve is placed in its down position, permitting fluid pressure to pass through the valve, by spring 133. Since the rear servo unit clutch was already applied in third speed, the control system is positioned to place the transmission in fourth speed.

Reverse

When shifting into reverse, a manual control lever on the manual control valve 110, actuates a reverse anchor crank and engages a reverse pawl mechanically with external teeth on a reverse unit gear (not shown). Accordingly, reverse condition of operation is obtained when the manual control valve is positioned to actuate the front band servo unit 10 to apply the front band, while releasing the rear band servo unit. No clutches are engaged.

In reverse, the front band servo unit 10 is actuated to apply the front band, while the front clutch, rear clutch, and rear bands are released. The operation of the control system in reverse is illustrated in Figure 6.

Manual valve 110 is positioned to direct pump pressure from line 153 to lines 178, 179, while governor input pressure to line 190 is cut off. At the same time, line pressure is conducted from pipe 153 through line 154 to apply the front band servo, and through branch line 155 to the TV valve 120. TV output pressure in passages 156 and 159 is applied to 3rd to 4th shift valve regulator plug 101, through passage 108 to chamber 109, to force shift valve 100 down. TV pressure from passage 160 enters chamber 83 of 1st to 2nd shift valve 80 through passage 82, to assist line pressure from passage 179 in holding the shift valve in its down position. TV pressure from line 161 passes to chamber 99 of 2nd to 3rd shift valve 90 through passage 98, to hold the shift valve in its down position. Since governor input pressure is cut off by manual valve 110, there is no governor pressure tending to upshift the shift valves. With the shift valves thus maintained in the down position, fluid pressure in passage 152a is blocked off. Fluid pressure from line 152 is directed through manual valve 110 to lines 168, 169 and 170 to release the rear band servo. Fluid pressure to the front clutch servo is cut off by 3rd to 4th shift valve 100, while fluid pressure to the rear clutch servo is cut off by manual valve 110 and 2nd to 3rd shift valve 90.

Figure 7 shows the accelerator pedal 204 connected to rod 206 by means of bell crank lever 208, link 203, leading to the vehicle engine throttle, and bell crank lever 208 moving in unison in response to movement of the accelerator pedal. A shaft 205, rotatable in the control housing cover plate (not shown), is adapted to be rotated upon movement of lever 210 attached to the end rod 206 located outside the cover plate. Lever 207, fixed to and rotated by shaft 205, is located inside the cover plate and moves TV valve 120 so that the TV output pressure is determined by the position of the vehicle accelerator pedal. Thus, the greater the throttle opening, the greater will be the TV pressure.

As was heretofore explained, the TV pressure, varying with the position of the vehicle engine throttle spring as determined by the position of the vehicle accelerator pedal, is applied to the pressure control valve 51 of Figure 1 to vary the line pressure in accordance with the torque requirements of the servomotors utilized to apply the bands and clutches of the planetary transmission. Thus, at low speeds, or whenever the vehicle engine throttle is partially closed, less pressure is required to prevent slipping of the bands and clutches than is the case when the vehicle throttle is fully open. By modifying the line pressure in accordance with the position of the vehicle engine throttle valve, lower line pressures are carried during normally partially closed throttle conditions, thereby minimizing engine horsepower utilized in developing fluid pressure for actuating the servomotors. Likewise, a smoother, softer engagement of the clutches and bands is obtained during partially open throttle conditions of operation, and yet slippage of the bands is prevented during open throttle operation of the vehicle.

There has thus been provided in a control system for a transmission the following novel features which contribute to smoother, more economical performance: prevention of undesirable speed-up of the engine in starting the vehicle, second speed start, and rapid rear servo band application and release of the reverse servo blocker through the provision of an auxiliary fluid pressure discharge passage in the rear servo. Clutch and band torque capacity is varied in accordance with the accelerator pedal to provide for smooth clutch and band engagement. Horsepower consumed in developing pump pressure is minimized by controlling the line pressure above a predetermined minimum pressure in accordance with the position of the accelerator pedal. Spring means associated with the compensator valve and double transition valves, respectively, assure proper positioning of the valves upon release of TV pressure to prevent undesirable engine speed-up. Second speed start is provided for by spring loading the 1st to 2nd shift valve to its up or second speed position. Again, more rapid response of the control system is assured through the provision of an auxiliary fluid pressure discharge passage for the rear band servo unit, the auxiliary discharge passage being controlled by one of the shift valves. These features in the control system contribute to smoother, quicker, and more rapid performance and minimize horsepower consumed in the provision of fluid pressure for operating the control system.

Further advantages are typified in the foregoing description and in the appended claims.

We claim:

1. In a control system for a transmission adapted for use in a vehicle having an accelerator for controlling the position of the vehicle engine throttle, a pump for supplying fluid pressure, fluid pressure responsive means for determining the gear ratio in said transmission, shift valves for selectively connecting said pump to said pressure responsive means, spring biasing means for yieldably positioning one of said shift valves to a predetermined position effective to select a given gear ratio in said transmission, a manual valve adapted to direct pump pressure to said shift valve in opposition to said spring biasing means, a governor adapted to direct fluid pressure to said shift valve in assistance to said spring biasing means, a pressure regulator valve associated with said pump and adapted to maintain a minimum pressure in said system, fluid pressure responsive means associated with said pressure regulator valve actuatable to vary the fluid pressure in said system, and valve mans responsive to movement of said accelerator for varying the pressure in said system.

2. In a control system for a speed ratio changing transmission having fluid pressure servo members for determining the gear ratio of said transmission, a source of fluid pressure, means including a plurality of fluid pressure actuated shift valves and a manually actuatable valve for selectively directing fluid pressure from said source to said servo members for selecting the transmission gear ratio, a pressure regulator valve operable to maintain a predetermined minimum system pressure, fluid pressure responsive means associated with said pressure regulator valve for varying the system pressure, and a metering valve connecting said pressure responsive means to said fluid pressure source through said manual valve, said pressure responsive means being effective to progressively increase the system pressure in response to movement of said metering valve from a closed to a fully opened position.

3. In a control system for a transmission adapted for use in a vehicle having an accelerator control for determining the position of the vehicle engine throttle, fluid pressure responsive gear ratio-determining members actuatable to determine the gear ratio of said transmission, a source of fluid pressure, means including a plurality of fluid pressure actuated valves and a manually actuatable valve for selectively directing pressure to said ratio-determining members for selecting the transmission gear ratio, pressure regulating means for maintaining a minimum pressure in said system, a metering valve for hydraulically connecting said pressure regulating means to said fluid pressure source through said manual valve, and a mechanical connection between said metering valve and said accelerator control for actuating said metering valve, said metering valve being effective to progressively increase the pressure in said system in response to movement of said accelerator control from a throttle closing to a throttle opening position.

4. In combination in a control system for a vehicle having a throttle controlled engine, a transmission having fluid pressure responsive members for determining the gear ratio of said transmission, a pump, a plurality of fluid pressure controlled shift valves for selectively connecting said pump to said pressure responsive members to determine the gear ratio of said transmission, valve means movable under the influence of fluid pressure to connect at least one of said ratio determining members to one of said shift valves, and biasing means effective to move said valve means to connect said ratio determining member to another of said shift valves in the absence of fluid pressure influence upon said valve means.

5. In a control system for a transmission adapted to transmit power from a throttle-controlled power source to an output shaft, a pump for supplying fluid pressure, fluid pressure actuated servo members for determining the gear ratio of said transmission, hydraulically actuated shift valves for controlling the admission of pressure to said servo members, an additional fluid pressure controlled valve movable to selectively connect one of said servo members to fluid pressure delivered by one of said shift valves, means for admitting pump line pressure to one side of said additional valve, means for admitting modified line pressure to said additional valve in opposition to said line pressure, said modified pressure being varied in accordance with the position of the vehicle engine throttle, and spring means biasing said additional valve to a predetermined position in the absence of fluid pressure influence thereupon for hydraulically connecting said servo member to fluid pressure delivered by another of said shift valves.

6. In a control system for a vehicle transmission having means for controlling the position of the vehicle engine throttle, a pump for supplying fluid pressure, fluid pressure responsive members for determining the gear ratio of said transmission, shift valves for selectively connecting said pump to said pressure responsive members to determine the gear ratio in said transmission, a compensator valve movable to direct modified pump pressure to at least one of said fluid pressure responsive members, metering valve means controlled by the position of said throttle control means for directing to said compensator valve fluid pressure which varies in accordance with the position of the throttle control means for controlling the position of said compensator valve, and spring means biasing said compensator valve in opposition to said last-mentioned fluid pressure for moving said compensator valve to a predetermined position upon release of said last-mentioned pressure.

7. In a control system for a transmission adapted to transmit power from a throttle-controlled power source to an output shaft, a pump for supplying fluid pressure, fluid pressure responsive members for determining the gear ratio of said transmission, shift valves for selectively connecting said pump to said pressure responsive members to determine the gear ratio of said transmission, a compensator valve movable to direct modified pump pressure to said pressure responsive members, valve means controlled by the position of said throttle for directing fluid pressure to said compensator valve to control the position of said compensator valve, and spring means yieldably biasing said compensator valve in opposition to said last-mentioned fluid pressure for moving said valve to a predetermined position upon release of said last-mentioned pressure.

8. In a control system for a transmission having fluid pressure responsive servo members operable to determine the gear ratio of said transmission, a pump, shift valves for selectively connecting said servo members to said pump to select gear ratio in said transmission, spring means normally applying one of said servo members, valve means for directing fluid pressure to said one servo member in opposition to said spring means to release said one servo member, a fluid pressure discharge passage for exhausting fluid pressure from said one servo member, valve means in said servo member permitting restricted fluid pressure discharge from said servo to said passage, an additional discharge passage for said servo, and means controlled by one of said shift valves for regulating fluid pressure discharge through said additional discharge passage.

9. The combination set forth in claim 8 together with a fluid pressure actuated reverse blocking mechanism connected in series with one servo member.

10. In a control system for a transmission having fluid pressure responsive servo members operable to determine the gear ratio of said transmission, a pump for supplying fluid pressure, shift valves for selectively connecting said servo members to said pump to select the gear ratio, spring means yieldably biasing one of said shift valves to a predetermined position, spring means normally biasing one of said servo members to a predetermined position, means for introducing fluid pressure to said one servo member in opposition to said last-mentioned spring means to move said member against said spring, means permitting restricted fluid pressure discharge from said one servo member, means selectively operable for moving said shift valve against said valve biasing spring, and means controlled by said spring biased shift valve for permitting unrestricted fluid pressure discharge from said one servo member.

11. The combination set forth in claim 10 together with a fluid pressure actuated reverse blocker mechanism connected in series with said one servo member.

12. In a control system for a ratio-changing transmission having fluid pressure responsive servo members operable to determine the gear ratio of said transmission, a pump for supplying fluid pressure, shift valves for selectively connecting said servo members to said pump to select the gear ratio, spring means yieldably biasing one of said shift valves for selecting a predetermined gear ratio, spring means normally biasing one of said servo members to a predetermined position of operation, means for introducing fluid pressure to said one servo member in opposition to said last-mentioned spring means to move said member against said spring, valve means providing restricted fluid pressure discharge from said servo member, an auxiliary fluid pressure discharge passage for said servo member, means for blocking said passage, a passage connecting said shift valve and said blocking means, and means selectively operable for moving said shift valve against said valve biasing spring, said shift valve being effective in one position to direct fluid pressure to said last-mentioned passage to block said auxiliary discharge passage.

13. The combination set forth in claim 12 together with a fluid pressure actuated reverse blocker mechanism connected in series with said one servo member.

14. In a control system for a transmission, a pump, fluid pressure responsive servo members for determining the gear ratio of said transmission, shift valves for selectively connecting said servo members to said pump to vary the gear ratio of said transmission, spring means yieldably biasing one of said shift valves to select a given gear ratio in said transmission, spring means yieldably urging one of said servo members to a predetermined position, means for directing pump pressure to said one servo member to move said member against the action of said spring, a check valve having a restricted opening therein for permitting restricted fluid pressure discharge from said one servo member, an auxiliary discharge passage, blocking means in said auxiliary discharge passage yieldably biased to open said passage, means operable to move said one shift valve against said shift valve biasing spring, and a passage connecting said blocking means and said one shift valve, said shift valve being effective in said last-mentioned position to direct fluid pressure to said blocking means and to block off said auxiliary discharge passage.

15. The combination set forth in claim 14 together with a fluid pressure actuated reverse blocker mechanism connected in series with said one servo member.

16. In a control system for a transmission adapted to transmit power from a throttle-controlled power source to an output shaft, a pump for supplying fluid pressure, fluid pressure responsive members for determining the gear ratio of said transmission, shift valves for selectively connecting said pressure responsive members to said pump to vary the gear ratio of said transmission, spring means normally biasing one of said shift valves to select a predetermined gear ratio in said transmission, spring means normally urging one of said pressure responsive members to a predetermined position to select a given gear ratio in said transmission, means for introducing fluid pressure to said pressure responsive member in opposition to said spring means, a check valve having a restricted orifice therein for permitting restricted fluid pressure leakage from said pressure responsive member under action of said spring means, an auxiliary fluid pressure discharge passage, means for blocking said auxiliary discharge passage, a manual valve operable to direct fluid pressure to said shift valve in oppositon to said shift valve biasing spring to move said shift valve, and a fluid pressure passage connecting said blocking means and said shift valve, said shift valve being effective when moved against said shift valve biasing spring to direct fluid pressure to said blocking means to open said auxiliary discharge passage to permit rapid discharge of fluid pressure from said fluid pressure responsive device.

17. In a control system for a transmission having fluid pressure responsive servo members operable to determine the gear ratio of said transmission, a pump for supplying fluid pressure, a shift valve adapted in one position to direct pressure fluid to said servo members to select a low transmission speed ratio and in another position to direct pressure fluid to said servo members to select a relatively higher transmission speed ratio, a spring continuously biasing said shift valve to select the relatively higher transmission speed ratio, and a manual valve movable to selectively direct fluid pressure to said shift valve in opposition to said spring to position said shift valve to select said low transmission speed ratio.

18. In a control system for a vehicle transmission having a plurality of fluid pressure operated units for determining the gear ratio of said transmission, a pump for supplying fluid under pressure, a plurality of shift valves movable to different positions to direct pressure from said pump to said fluid pressure operated units to select the transmission gear ratio, all of said shift valves being subject to fluid pressure varying in accordance with vehicle speed tending to move said valves in one direction to select a transmission gear ratio, at least one of said valves being subject to fluid pressure force tending to move said valve in the opposite direction to select a different gear ratio, a pressure metering valve controlled by the vehicle accelerator pedal for varying said last-mentioned fluid pressure force in accordance with the position of the vehicle accelerator pedal, a manual valve operable in one position to direct pump line pressure to another of said shift valves and tending to move said valve in opposition to said first mentioned pressure, said last-mentioned valve being subject to the fluid pressure which varies in accordance with the position of the vehicle accelerator pedal after being shifted by the force of said pump line pressure, the pressure which varies in accordance with the position of the vehicle accelerator pedal acting in assistance to the pump line pressure.

19. In a control system for a vehicle transmission having a plurality of fluid pressure operated units adapted to be selectively actuated to establish a driving connection the torque transmitting capacity of which varies in accordance with the pressure of fluid supplied to the unit, a pump for supplying fluid pressure, a plurality of shift valves for selectively controlling the supply of fluid from said pump to said fluid pressure operated units, each of said valves being subject to fluid pressure force in a control chamber and the opposing force of fluid pressure in a second control chamber, the magnitude of the latter force of which varies in accordance with vehicle speed, a manually controlled throttle valve for regulating the rate of supply of fuel to the vehicle engine, valve means governed in accordance with the position of said throttle for supplying said first-mentioned shift valve control chambers with fluid pressure at pressures which increase as said throttle is moved from a throttle closing to a throttle opening position, and means for varying the pressure of fluid supplied by said pump in accordance with the degree of opening of said throttle, said means comprising a pressure regulator valve subject to the opposing pressures of fluid supplied by said pump and of fluid supplied by said throttle valve, said pressure regulator valve controlling a passage through which fluid supplied by said pump may be released to a sump.

20. In a control system for a transmission adapted for use in a vehicle having an accelerator pedal for controlling the position of the vehicle engine throttle, drive ratio determining members adapted to be actuated by fluid pressure to vary the transmission drive ratio, a fluid pressure source, means for selectively directing fluid pressure to said drive ratio determining members, a pressure regulator valve pre-set to maintain a minimum fluid pressure delivery to said means for selectively directing fluid pressure to said drive ratio determining members, said minimum pressure being sufficient to initially engage and maintain engagement of selected ratio determining members under all operating conditions of said latter members, and a fluid pressure metering valve controlled by said accelerator pedal for delivering a variable hydraulic fluid pressure to said pressure regulating valve, the pressure level of fluid pressure delivered by said accelerator pedal controlled valve being increased as said accelerator pedal is moved from a throttle closing to a throttle opening position and the pressure level of the fluid pressure delivered to said means for selectively directing fluid pressure to said drive ratio determining members being increased as said accelerator pedal is moved from a throttle closing to a throttle opening position.

21. In combination in a control system for a vehicle having a throttle controlled engine, a transmission having fluid pressure responsive members for determining the gear ratio of said transmission, a pump, a plurality of fluid pressure operated shift valves for selectively connecting said pump to said pressure responsive members to determine the gear ratio of said transmission, valve means movable under the influence of fluid pressure to connect at least one of said ratio determining members to one of said fluid pressure operated shift valves, and biasing means effective to move said valve means to connect said ratio determining member to another of said fluid pressure oeprated shift valves in the absence of fluid pressure influence upon said valve means.

22. In combination in a control system for a vehicle having a throttle controlled engine, a transmission having fluid pressure responsive members for determining the gear ratio of said transmission, a pump, shift valve means for selectively connecting said pump to said pressure responsive members to determine the gear ratio of said transmission including a valve effective to control shift from first to second gear ratio, a valve effective to control shift from second to third gear ratio and a valve effective to control shift from third to fourth gear ratio, spring means yieldably biasing said second to third and third to fourth shift valves to select second and third speed gear ratios, responsively, spring means biasing said first to second speed shift valve to select second speed gear ratio, valve means movable under the influence of fluid pressure to connect at least one of said ratio determining members to one of said shift valves, and biasing means effective to move said valve means to connect said ratio determining member to another of said shift valves in the absence of fluid pressure influence upon said valve means.

23. In a control system for a transmission, a fluid pressure source, fluid pressure responsive servo members for determining transmission drive ratio, shift valves for selectively connecting said servo members to said source to vary the transmission drive ratio, spring means yieldably biasing one of said shift valves to select a given transmission drive ratio, spring means yieldably urging one of said servo members to a predetermined position, means for directing fluid pressure from said source to said one servo member to move said member against the action of said spring, means for permitting restricted fluid pressure discharge from said one servo member, an auxiliary discharge passage for said one servo member, blocking means in said auxiliary discharge passage yieldably biased to open said passage, means operable to move said one shift valve against said shift valve biasing spring, and a passage connecting said blocking means and said one shift valve, said shift valve being effective in said last-mentioned position to direct fluid pressure to said blocking means to block off said auxiliary discharge passage.

24. In a control system for a vehicle transmission having a plurality of fluid pressure operated servo units for determining drive ratio, a fluid pressure source, a plurality of shift valves for directing fluid pressure from said source to said servos to select the transmission drive ratio, all of said shift valves being subject to fluid pressure varying in accordance with vehicle speed tending to move said valves in one direction to select a transmission drive ratio, one of said valves being subject to fluid pressure force tending to move said valve in the opposite direction to select a different drive ratio, a pressure metering valve controlled by the vehicle accelerator pedal for varying said last-mentioned fluid pressure force in accordance with the position of said vehicle accelerator pedal, a manual valve operable in one position to direct fluid pressure from said source to another of said shift valves and tending to move said valve in opposition to said first-mentioned pressure, said last-mentioned valve being subject to the fluid pressure which varies in accordance with the position of the vehicle accelerator pedal after being shifted by the force of fluid pressure from said fluid pressure source, the pressure which varies in accordance with the position of the vehicle accelerator pedal acting in assistance to the fluid pressure from said fluid pressure source.

25. In a control system for a vehicle transmission having a plurality of fluid pressure operated servo units adapted to be selectively actuated for establishing a driving connection the torque transmitting capacity of which varies in accordance with the pressure level of fluid supplied thereto, a fluid pressure source, a plurality of shift valves for controlling the admission of fluid pressure from said source to said servo units, a first control chamber associated with each of said shift valves, a second control chamber associated with each of said shift valves, a vehicle speed responsive governor adapted to deliver a variable fluid pressure which varies in accordance with vehicle speed to said second control chambers, a manually controlled throttle valve for regulating the rate of fuel supply to the vehicle engine, valve means governed in accordance with the position of said throttle for supplying said first shift valve control chambers with fluid pressure which increases as said throttle is moved from a throttle closing to a throttle opening position, and means for varying the pressure of fluid supplied from said fluid pressure source in accordance with the degree of opening of said throttle, said means comprising a pressure regulator valve subject to the opposing pressures of fluid supplied from said source and of fluid supplied by said throttle valve, said pressure regulator valve controlling a passage through which fluid supplied by said fluid pressure source may be released to a sump.

26. In combination in a transmission control system, a transmission having fluid pressure responsive drive ratio determining members, a pump, a plurality of fluid pressure controlled shift valves for selectively connecting said pump to said fluid pressure responsive members for determining the transmission drive ratio, an additional fluid pressure controlled valve movable to selectively connect one of said drive ratio determining members to fluid pressure delivered by one of said shift valves, means for admitting pressure to one side of said additional valve, means for admitting pressure to said additional valve in opposition to said first-mentioned pressure, and means biasing said additional valve to a predetermined position in the absence of fluid pressure thereupon for hydraulically connecting said drive ratio determining member to fluid pressure delivered by another of said shift valves.

27. In a control system for a speed ratio-changing transmission having ratio-determining members actuated by fluid pressure, a fluid pressure source, hydraulically controlled shift valves for selectively directing fluid pressure to said ratio-determining members for selecting the transmission drive ratio, a pressure regulator valve for controlling the pressure value of pressure supplied to said ratio determining members through said shift valves, an accelerator pedal controlled pressure metering valve adapted to deliver a variable pressure to said shift valves to control the position of said shift valves and to said pressure regulator valve to control the pressure value of the pressure delivered by said pressure regulator valve, said pressure metering valve being arranged to progressively deliver an increasing fluid pressure to said shift valves and said pressure regulator valve as said accelerator pedal is moved from a throttle closing to a throttle opening position.

28. In a control system for a transmission having drive ratio determining members actuated by fluid pressure, a fluid pressure source, shift valves for selectively directing fluid pressure from said source to said ratio determining members for selecting the drive ratio of said transmission, a pressure regulator valve, means biasing said pressure regulator valve to maintain a minimum pressure in said system, said minimum pressure being sufficient to initially engage and maintain engagement of selected ratio determining members under all operating conditions of said latter members, hydraulic fluid pressure responsive means operably associated with said pressure regulator valve acting in assistance to said biasing means to increase said system pressure upon delivery of hydraulic fluid pressure thereto, an accelerator pedal controlled pressure metering valve hydraulically connected to said shift valves and to said pressure hydraulic fluid pressure responsive means, said pressure metering valve including a valve element, fluid pressure supply and delivery ports and a control member, said control member being operatively connected to said accelerator pedal and valve element, said control member being effective to position said valve element to deliver fluid at a pressure corresponding to the position of said accelerator pedal at any given instant and variable in accordance with movement of said accelerator pedal throughout the range of movement of said accelerator pedal being arranged to deliver a variable pressure to said shift valves to control the position of said shift valves and to deliver a variable pressure to said pressure regulator valve to control the pressure supplied to said ratio determining members through said shift valves, said pressure metering valve being arranged to deliver fluid at a pressure continuously variable throughout the range of movement of said accelerator pedal.

29. In a control system for a vehicle transmission having a plurality of hydraulically controlled servo members operable to establish first, second, or third drive ratios, a pump for supplying fluid pressure, a manually operable drive range selector valve having neutral, first and second forward drive range positions, respectively, a shift valve effective in one position to establish first speed drive ratio and effective in a second position to establish second speed drive ratio, an additional shift valve for controlling the shift from second to third drive ratios, a vehicle speed responsive governor for delivering a variable hydraulic pressure to said shift valves tending to upshift the same, said governor pressure being increased with increase in vehicle speed, an accelerator pedal controlled valve for delivering a variable pressure to said shift valves in opposition to said governor pressure and tending to downshift said shift valves, a passage connecting said drive range selector valve and said shift valves, said drive range selector valve being effective in its first range position to connect said passage to said pump, the hydraulic pressure admitted to said shift valves through said passage being effective to initially position both of said shift valves in their downshift position.

30. In a control system for a vehicle transmission having a plurality of hydraulically controlled servo members operable to establish first, second or third speed drive ratios, a pump for supplying fluid under pressure, a manually operable drive range selector valve having neutral, first and second forward drive range positions, a shift valve having a downshift position effective to establish first speed drive ratio and an upshift position effective to establish second speed drive ratio, an additional shift valve having an upshift position for establishing third speed drive ratio and a downshift position for controlling shift from third to second speed drive ratio, a vehicle speed responsive governor connected to said pump and adapted to deliver a variable hydraulic pressure to said shift valves to upshift said valves, a manually operable valve for delivering a variable pressure to said shift valves tending to downshift said valves, a passage connecting said drive range selector valve to said shift valves, said drive range selector being effective in its first drive range position to connect said passage to said pump to deliver pump pressure to said shift valves, said pump pressure being operative upon said shift valves to yieldably bias said shift valves to their downshift position.

31. In a control system for a vehicle transmission having a plurality of hydraulically controlled servo members operable to establish first, second or third speed drive ratios, a pump for supplying fluid pressure, a manually operable drive range selector valve having neutral, first, and second forward drive range positions, respectively, a shift valve effective in one position to establish first speed drive ratio and effective in a second position to establish second speed drive ratio, a spring yieldably biasing said shift valve to its second speed position, an additional shift valve for controlling shift from second to third drive ratios, a vehicle speed responsive governor connected to said pump and adapted to deliver a variable hydraulic pressure to said shift valves tending to upshift said shift valves, a manually operable valve for delivering a variable hydraulic pressure to said shift valves tending to downshift said valves, a passage connecting said drive range selector valve to said shift valves, said drive range selector valve being effective in its first forward drive range position to connect said passage to said pump to deliver pressure to said first to second shift valve to position said valve in its first drive ratio position, said drive range selector valve being effective in its second forward drive range position to connect said passage to exhaust.

32. In a control system for a vehicle transmission having a plurality of hydraulically controlled servos operable to establish first, second or third drive ratios, a pump for supplying fluid pressure, a manually operable drive range selector valve having neutral, low and high forward drive range positions, respectively, a shift valve effective in one position to establish first speed drive ratio and effective in a second position to establish second speed drive ratio, spring means yieldably biasing said shift valve to its second speed position, an additional shift valve for controlling shift from second to third drive ratios, a vehicle speed responsive governor hydraulically connected to said pump for delivering a variable hydraulic pressure to said shift valves tending to upshift the same, an accelerator pedal controlled valve hydraulically connected to said pump for delivering a variable hydraulic pressure to said shift valves in opposition to said governor pressure and tending to downshift said shift valves, a passage connecting said drive range selector valve to said first to second speed shift valve, said drive range selector valve being effective in its low range position to connect said passage to said pump, the hydraulic pressure in said passage being effective to position said first to second shift valve to select first speed drive ratio, said drive range selector valve being effective in its high range position to connect said passage to exhaust.

33. In a control system for a speed ratio-changing transmission having ratio-determining members actuated by fluid pressure, a source of fluid pressure, shift valves for selectively directing fluid pressure to said ratio-determining members for selecting the gear ratio of said transmission, a pressure regulator valve, means biasing said pressure regulator valve to maintain a minimum pressure in said system, said minimum pressure being sufficient to engage and maintain engagement of selected ratio determining members under all operating conditions of said latter members, fluid pressure responsive means associated with said pressure regulator valve for modifying the fluid pressure in said system, and manually operable pressure metering valve means including a valve element, fluid pressure supply and delivery ports and a manually operable control member, said control member being movable throughout a range of positions between a first and a final position for directing a variable fluid pressure to said pressure responsive means for increasing the pressure in said system, said manually operable pressure metering valve element being actuated by said control member to supply fluid at a pressure which varies in accordance with the extent of movement of said control member throughout its range of movement between said first and final positions.

34. In a transmission control system having gear ratio-determining members actuated by fluid pressure, a fluid pressure source, shift valves for selectively directing fluid pressure to said ratio-determining members for selecting the gear ratio of said transmission, a pressure regulator valve, spring means biasing said pressure regulator valve to maintain a predetermined minimum pressure in said system, said minimum pressure being sufficient to engage and maintain engagement of selected ratio determining members under all operating conditions of said latter members, fluid pressure responsive means associated with said pressure regulator valve actuatable to vary the pressure in said system, and manually operable pressure metering valve including a valve member, fluid pressure supply and delivery ports and a manually operable control member said control member being movable throughout a range of positions between a first and a final position for directing variable fluid pressure to said pressure responsive means in assistance to said spring means for increasing the fluid pressure in the system above said predetermined minimum pressure, said manually operable control member being operable upon said valve member to supply fluid at a pressure which varies in accordance with the extent of movement of said control member throughout its range of positions between said first and final positions.

35. In a control system for a transmission adapted for use in a vehicle having an accelerator for controlling the position of the vehicle engine throttle, fluid pressure responsive gear ratio-determining servo members actuatable to determine the gear ratio of said transmission, a source of fluid pressure, means for selectively directing fluid pressure to said servo members, pressure regulating means for maintaining a predetermined minimum pressure in said system, said minimum pressure being sufficient to engage and maintain engagement of selected ratio determining members under all operating conditions of said latter members, and a pressure metering valve governed by movement of said accelerator for supplying fluid under pressure to said pressure regulating means for varying the fluid pressure in said system, said pressure metering valve including a valve member, fluid pressure supply and delivery ports, and an accelerator pedal operated control member, said valve member being movable with respect to said ports by said control member to supply fluid at a pressure which varies in accordance with the amount of movement of the accelerator pedal throughout its range of movement from the throttle closing to the throttle opening position.

36. In a control system for a transmission adapted for use in a vehicle having an accelerator for controlling the position of the vehicle engine throttle, gear ratio-determining members adapted to be actuated by fluid pressure to vary the gear ratio of said transmission, a source of fluid pressure, means for selectively directing fluid pressure to said ratio-determining members, a pressure regulator valve pre-set to maintain a minimum pressure in said system, said minimum pressure being sufficient to engage and maintain engagement of selected ratio determining members under all operating conditions of said latter members, and fluid pressure metering valve means responsive to movement of said accelerator for delivering a variable hydraulic fluid pressure to said pressure regulator valve for increasing the pressure in said system as said accelerator pedal is moved from a throttle closing to a throttle opening position, said metering valve means including pressure supply and delivery ports, a valve member and a control member for controlling the position of said valve with respect to said ports, said control member being actuated by said accelerator pedal to position said valve member to supply fluid at a pressure which varies in accordance with the extent of movement of said accelerator pedal from the throttle closing to the throttle opening position.

37. In a control system for a transmission adapted for use in a vehicle having an accelerator for controlling the position of the vehicle engine throttle, a pump for supplying fluid pressure, fluid pressure responsive members for determining the gear ratio of said transmission, means for selectively directing fluid pressure from said pump to said fluid pressure responsive members to select the gear ratio of said transmission, a pressure regulator valve for said pump, spring means biasing said pressure regulator valve to maintain a minimum pump output pressure, said minimum pressure being sufficient to engage and maintain engagement of selected ratio determining members under all operating conditions of said latter members, fluid pressure responsive means associated with said pressure regulator valve, and valve means movable in response to movement of said accelerator for directing fluid pressure to said last-mentioned fluid pressure responsive means effective to vary the pressure in said system, the last named valve means including pressure supply and delivery ports, a valve member and a control member actuated by said accelerator pedal, said control member being effective to position said valve member to supply fluid at a pressure which varies in accordance with the extent of movement of the accelerator from the throttle closing position to the throttle opening position.

38. In a control system for a drive ratio changing transmission having fluid pressure actuated drive ratio determining members, a fluid pressure source, shift valves for selectively directing fluid pressure to said ratio-determining members for selecting the drive ratio of said transmission, a pressure regulator valve for controlling the pressure level of fluid pressure supplied to said shift valves, means biasing said pressure regulator valve to maintain a minimum fluid pressure delivery by said pressure regulator valve, said minimum pressure being sufficient to engage and maintain engagement of selected ratio determining members under all operating conditions of said latter members, fluid pressure responsive means associated with said pressure regulator valve for modifying the pressure level of fluid pressure delivered to said shift valves, and a manually operable pressure metering valve including pressure supply and discharge ports, a valve member and a control member said control member being movable throughout a range of positions between a first and a final position for directing variable fluid pressure to said pressure responsive means for increasing the pressure level of fluid pressure delivered to said shift valves above that maintained by said pressure regulator valve biasing means, said manually operable pressure metering valve member being movable by said control member to supply fluid at a pressure which varies in accordance with the extent of movement of said control member in its range of positions between said first and final positions.

39. In a transmission control system having drive ratio determining members actuated by fluid pressure, a fluid pressure source, shift valves for selectively directing fluid pressure to said ratio-determining members for selecting the transmission drive ratios, a pressure regulator valve, spring means biasing said pressure regulator valve to maintain a minimum fluid pressure delivery to said shift valves, said minimum pressure being sufficient to engage and maintain engagement of selected ratio determining members under all operating conditions of said latter members, fluid pressure responsive means associated with said pressure regulator valve actuatable to vary the pressure level of fluid pressure delivered to said shift valves, and a manually operable pressure metering valve having a pressure metering valve member and a control member movable throughout a range of positions between a first and a final position for directing a variable fluid pressure to said fluid pressure responsive means in assistance to said spring means for increasing the pressure level of fluid pressure supplied to said shift valves above said minimum pressure, said manually operable pressure metering valve member being positioned by said control member to supply fluid at a pressure which varies in accordance with the extent of movement of said control member throughout its range of positions between said first and final positions.

40. In a control system for a transmission adapted for use in a vehicle having an accelerator pedal for controlling the position of the vehicle engine throttle, fluid pressure responsive drive ratio determining servo members actuatable to determine the drive ratio of said transmission, a fluid pressure source, means for selectively directing fluid pressure to said servo members, a pressure regulator valve for controlling the pressure level of fluid pressure supplied to said fluid pressure directing means, said minimum pressure being sufficient to engage and maintain engagement of selected ratio determining members under all operating conditions of said latter members, and a pressure metering valve controlled by said accelerator pedal, said pressure metering valve including a valve element and a control member movable throughout a range of positions by said accelerator pedal said pressure metering valve element being connected to deliver a variable hydraulic pressure to said pressure regulator valve for varying the pressure level of fluid pressure supplied to said fluid pressure directing means, said pressure metering valve element being positioned by said control member to supply fluid at a pressure which varies in accordance with the extent of movement of the accelerator pedal between the throttle closing and the throttle opening positions.

References Cited in the file of this patent

UNITED STATES PATENTS

| | | |
|---|---|---|
| 1,607,986 | Jones | Nov. 20, 1926 |
| 2,170,869 | Neracher | Aug. 29, 1939 |
| 2,193,305 | Thompson | Mar. 12, 1940 |
| 2,204,872 | Thompson | June 18, 1940 |
| 2,205,470 | Dunn et al. | June 25, 1940 |
| 2,221,393 | Carnegie | Nov. 12, 1940 |
| 2,223,716 | Bojesen | Dec. 3, 1940 |
| 2,229,345 | Schotz | Jan. 21, 1941 |
| 2,282,949 | Dolza | May 12, 1942 |
| 2,372,814 | Dodge | Apr. 3, 1945 |
| 2,516,203 | Greenlee | July 25, 1950 |
| 2,528,585 | Farkas et al. | Nov. 7, 1950 |
| 2,557,421 | Evernden | June 19, 1951 |
| 2,576,336 | Farkas | Nov. 27, 1951 |
| 2,584,965 | McFarland | Feb. 5, 1952 |
| 2,627,189 | McFarland | Feb. 3, 1953 |
| 2,640,373 | Jandasek | June 2, 1953 |
| 2,644,559 | Randol | July 7, 1953 |
| 2,663,393 | Livermore | Dec. 22, 1953 |

FOREIGN PATENTS

| | | |
|---|---|---|
| 607,120 | Great Britain | Aug. 26, 1948 |